US007117146B2

(12) United States Patent
Gao

(10) Patent No.: US 7,117,146 B2
(45) Date of Patent: Oct. 3, 2006

(54) SYSTEM FOR IMPROVED USE OF PITCH ENHANCEMENT WITH SUBCODEBOOKS

(75) Inventor: Yang Gao, Mission Viejo, CA (US)

(73) Assignee: Mindspeed Technologies, Inc., Newport Beach, CA (US)

( * ) Notice: Subject to any disclaimer, the term of this patent is extended or adjusted under 35 U.S.C. 154(b) by 692 days.

(21) Appl. No.: 09/940,904

(22) Filed: Aug. 27, 2001

(65) Prior Publication Data

US 2002/0103638 A1 Aug. 1, 2002

Related U.S. Application Data

(60) Provisional application No. 60/232,938, filed on Sep. 15, 2000, provisional application No. 60/233,043, filed on Sep. 15, 2000, provisional application No. 60/232,939, filed on Sep. 15, 2000, provisional application No. 60/233,045, filed on Sep. 15, 2000, provisional application No. 60/232,958, filed on Sep. 15, 2000, provisional application No. 60/233,042, filed on Sep. 15, 2000, provisional application No. 60/233,046, filed on Sep. 15, 2000, provisional application No. 60/233,044, filed on Sep. 15, 2000, provisional application No. 60/097,569, filed on Aug. 24, 1998.

(51) Int. Cl.
*G01L 19/00* (2006.01)
*G01L 11/04* (2006.01)

(52) U.S. Cl. .................... 704/200.1; 704/207; 704/201

(58) Field of Classification Search ................ 704/201, 704/207–208, 219–220, 221, 200.1
See application file for complete search history.

(56) References Cited

U.S. PATENT DOCUMENTS 5,414,796 A * 5/1995 Jacobs et al. ............... 704/221
5,495,555 A * 2/1996 Swaminathan .............. 704/207
5,596,676 A * 1/1997 Swaminathan et al. ..... 704/208
5,727,123 A * 3/1998 McDonough et al. ........ 704/224
5,751,903 A * 5/1998 Swaminathan et al. ..... 704/230
5,752,223 A * 5/1998 Aoyagi et al. .............. 704/219
5,774,837 A * 6/1998 Yeldener et al. ............ 704/208
5,787,389 A * 7/1998 Taumi et al. ............... 704/219
5,787,391 A * 7/1998 Moriya et al. .............. 704/225
5,797,119 A * 8/1998 Ozawa ......................... 704/223
5,825,311 A * 10/1998 Kataoka et al. ............... 341/51

(Continued)

*Primary Examiner*—David Hudspeth
*Assistant Examiner*—James S. Wozniak
(74) *Attorney, Agent, or Firm*—Farjami & Farjami LLP

(57) ABSTRACT

A speech compression system capable of encoding a speech signal into a bitstream for subsequent decoding to generate synthesized speech is disclosed. The speech compression system optimizes the bandwidth consumed by the bitstream by balancing the desired average bit rate with the perceptual quality of the reconstructed speech. The speech compression system comprises a full-rate codec, a half-rate codec, a quarter-rate codec and an eighth-rate codec. The codecs are selectively activated based on a rate selection. In addition, the full and half-rate codec are selectively activated based on a type classification. Each codec is selectively activated to encode and decode the speech signals at different bit rates emphasizing different aspects of the speech signal to enhance overall quality of the synthesized speech. The overall quality of the system is strongly related to the excitation. In order to enhance the excitation, the system contains a fixed codebook comprising several subcodebooks. The invention reveals a way to apply a pitch enhancement efficiently and differently for different subcodebooks without using additional bits. The technique is particularly applicable to selectable mode vocoder (SMV) systems.

34 Claims, 12 Drawing Sheets

U.S. PATENT DOCUMENTS 5,878,387 A * 3/1999 Oshikiri et al. ............. 704/207
5,926,786 A * 7/1999 McDonough et al. ....... 704/224
5,946,651 A * 8/1999 Jarvinen et al. ............ 704/223
6,148,283 A * 11/2000 Das ............................ 704/222

* cited by examiner

SYSTEM FOR IMPROVED USE OF PITCH ENHANCEMENT WITH SUBCODEBOOKS

CROSS-REFERENCE TO RELATED APPLICATIONS

This application claims priority to Provisional Application Ser. No. 60/232,938, filed Sep. 15, 2000. Other applications and patents listed below relate to and are useful in understanding various aspects of the embodiments disclosed in the present application. All are incorporated by reference in their entirety.

U.S. patent application Ser. No. 09/663,242, "SELECTABLE MODE VOCODER SYSTEM," filed on Sep. 15, 2000, and now U.S. Pat. No. 6,556,966.

U.S. Provisional Application Ser. No. 60/233,043, filed Sep. 15, 2000 "INJECTING HIGH FREQUENCY NOISE INTO PULSE EXCITATION FOR LOW BIT RATE CELP".

U.S. Provisional Application Ser. No. 60/232,939, "SHORT TERM ENHANCEMENT IN CELP SPEECH CODING," filed on Sep. 15, 2000.

U.S. Provisional Application Ser. No. 60/233,045, "SYSTEM OF DYNAMIC PULSE POSITION TRACKS FOR PULSE-LIKE EXCITATION IN SPEECH CODING," filed Sep. 15, 2000.

U.S. Provisional Application Ser. No. 60/232,958, "SPEECH CODING SYSTEM WITH TIME-DOMAIN NOISE ATTENUATION," filed on Sep. 15, 2000.

U.S. Provisional Application Ser. No. 60/233,042, "SYSTEM FOR AN ADAPTIVE EXCITATION PATTERN FOR SPEECH CODING," filed on Sep. 15, 2000.

U.S. Provisional Application Ser. No. 60/233,046, "SYSTEM FOR ENCODING SPEECH INFORMATION USING AN ADAPTIVE CODEBOOK WITH DIFFERENT RESOLUTION LEVELS," filed on Sep. 15, 2000.

U.S. patent application Ser. No. 09/663,837, "CODEBOOK TABLES FOR ENCODING AND DECODING," filed on Sep. 15, 2000, and now U.S. Pat. No. 6,574,593.

U.S. patent application Ser. No. 09/662,828, "BIT STREAM PROTOCOL FOR TRANSMISSION OF ENCODED VOICE SIGNALS," filed on Sep. 15, 2000, and now U.S. Pat. No. 6,581,032.

U.S. Provisional Application Ser. No. 60/233,044, "SYSTEM FOR FILTERING SPECTRAL CONTENT OF A SIGNAL FOR SPEECH ENCODING," filed on Sep. 15, 2000.

U.S. patent application Ser. No. 09/633,734, "SYSTEM FOR ENCODING AND DECODING SPEECH SIGNALS," filed on Sep. 15, 2000, and now U.S. Pat. No. 6,604,070.

U.S. patent application Ser. No. 09/663,002, "SYSTEM FOR SPEECH ENCODING HAVING AN ADAPTIVE FRAME ARRANGEMENT," filed on Sep. 15, 2000.

U.S. Provisional Application Ser. No. 60/097,569 entitled "ADAPTIVE RATE SPEECH CODEC," filed Aug. 24, 1998.

U.S. patent application Ser. No. 09/154,675, entitled "SPEECH ENCODER USING CONTINUOUS WARPING IN LONG TERM PREPROCESSING," filed Sep. 18, 1998, and now U.S. Pat. No. 6,449,590.

U.S. patent application Ser. No. 09/156,649, entitled "COMB CODEBOOK STRUCTURE," filed Sep. 18, 1998, and now U.S. Pat. No. 6,330,531.

U.S. patent application Ser. No. 09/156,648, entitled "LOW COMPLEXITY RANDOM CODEBOOK STRUCTURE," filed Sep. 18, 1998, and now U.S. Pat. No. 6,480, 822.

U.S. patent application Ser. No. 09/156,650, entitled "SPEECH ENCODER USING GAIN NORMALIZATION THAT COMBINES OPEN AND CLOSED LOOP GAINS," filed Sep. 18, 1998, and now U.S. Pat. No. 6,260,010.

U.S. patent application Ser. No. 09/156,832, entitled "SPEECH ENCODER USING VOICE ACTIVITY DETECTION IN CODING NOISE," filed Sep. 18, 1998.

U.S. patent application Ser. No. 09/154,654, entitled "PITCH DETERMINATION USING SPEECH CLASSIFICATION AND PRIOR PITCH ESTIMATION," filed Sep. 18, 1998, and now U.S. Pat. No. 6,507,814.

U.S. patent application Ser. No. 09/154,657 entitled "SPEECH ENCODER USING A CLASSIFIER FOR SMOOTHING NOISE CODING," filed Sep. 18, 1998, and now abandoned.

U.S. patent application Ser. No. 09/156,826, entitled "ADAPTIVE TILT COMPENSATION FOR SYNTHESIZED SPEECH RESIDUAL," filed Sep. 18, 1998, and now U.S. Pat. No. 6,385,573.

U.S. patent application Ser. No. 09/154,662, entitled "SPEECH CLASSIFICATION AND PARAMETER WEIGHTING USED IN CODEBOOK SEARCH," filed Sep. 18, 1998, and now U.S. Pat. No. 6,493,665.

U.S. patent application Ser. No. 09/154,653, entitled "SYNCHRONIZED ENCODER-DECODER FRAME CONCEALMENT USING SPEECH CODING PARAMETERS," filed Sep. 18, 1998, and now U.S. Pat. No. 6,188,980.

U.S. patent application Ser. No. 09/154,663, entitled "ADAPTIVE GAIN REDUCTION TO PRODUCE FIXED CODEBOOK TARGET SIGNAL," filed Sep. 18, 1998, and now U.S. Pat. No. 6,104,992.

U.S. patent application Ser. No. 09/154,660, entitled "SPEECH ENCODER ADAPTIVELY APPLYING PITCH LONG-TERM PREDICTION AND PITCH PREPROCESSING WITH CONTINUOUS WARPING," filed Sep. 18, 1998, and now U.S. Pat. No. 6,330,533.

BACKGROUND OF THE INVENTION

1. Technical Field

This invention relates to speech communication systems and, more particularly, to systems and methods for digital speech coding.

2. Related Art

One prevalent mode of human communication involves the use of communication systems. Communication systems include both wireline and wireless radio systems. Wireless communication systems electrically connect with the landline systems and communicate using radio frequency (RF) with mobile communication devices. Currently, the radio frequencies available for communication in cellular systems, for example, are in the frequency range centered around 900 MHz and in the personal communication services (PCS) frequency range centered around 1900 MHz. Due to increased traffic caused by the expanding popularity of wireless communication devices, such as cellular telephones, it is desirable to reduced bandwidth of transmissions within the wireless systems.

Digital transmission in wireless radio communications is increasingly being applied to both voice and data due to noise immunity, reliability, compactness of equipment and the ability to implement sophisticated signal processing functions using digital techniques. Digital transmission of speech signals involves the steps of: sampling an analog speech waveform with an analog-to-digital converter, speech compression (encoding), transmission, speech decompression (decoding), digital-to-analog conversion, and playback into an earpiece or a loudspeaker. The sampling of the analog speech waveform with the analog-to-digital converter creates a digital signal. However, the number of bits used in the digital signal to represent the analog speech waveform creates a relatively large bandwidth. For example, a speech signal that is sampled at a rate of 8000 Hz (once every 0.125 ms), where each sample is represented by 16 bits, will result in a bit rate of 128,000 ($16\times8000$) bits per second, or 128 Kbps (Kilo bits per second).

Speech compression reduces the number of bits that represent the speech signal, thus reducing the bandwidth needed for transmission. However, speech compression may result in degradation of the quality of decompressed speech. In general, a higher bit rate will result in higher quality, while a lower bit rate will result in lower quality. However, speech compression techniques, such as coding techniques, can produce decompressed speech of relatively high quality at relatively low bit rates. In general, coding techniques attempt to represent the perceptually important features of the speech signal, with or without preserving the actual speech waveform.

One coding technique used to lower the bit rate involves varying the degree of speech compression (i.e., varying the bit rate) depending on the part of the speech signal being compressed. Typically, parts of the speech signal for which adequate perceptual representation is more difficult or more important (such as voiced speech, plosives, or voiced onsets) are coded and transmitted using a higher number of bits, while parts of the speech signal for which adequate perceptual representation is less difficult or less important (such as unvoiced, or the silence between words) are coded with a lower number of bits. The resulting average bit rate for the speech signal may be relatively lower than would be the case for a fixed bit rate that provides decompressed speech of similar quality.

These speech compression techniques have resulted in lowering the amount of bandwidth used to transmit a speech signal. However, further reduction in bandwidth is important in a communication system for a large number of users. Accordingly, there is a need for systems and methods of speech coding that are capable of minimizing the average bit rate needed for speech representation, while providing high quality decompressed speech.

SUMMARY

A technique uses a pitch enhancement to improve the use of the fixed codebooks in cases where the fixed codebook comprises a plurality of subcodebooks. Code-excited linear prediction (CELP) coding utilizes several predictions to capture redundancy in voiced speech while minimizing data to encode the speech. A first short-term prediction results in an LPC residual, and a second long term prediction results in a pitch residual. The pitch residual may be coded using a fixed codebook that includes a plurality of fixed subcodebooks. The disclosed embodiments describe a system for pitch enhancements to improve the use of communication systems employing a plurality of fixed subcodebooks.

A pitch enhancement is used in a predictable manner to add pulses to the output from the fixed subcodebooks but without requiring any additional bits to encode this additional information. The pitch lag is calculated in an adaptive codebook portion of the speech encoder/decoder. These additional pulses result in encoded speech that more closely approximates the voiced speech. In the improvement, an adaptive pitch gain and a modifying factor are used to enhance the pulses from the fixed subcodebooks differently for different subcodebooks. These techniques are used in such a manner that no extra bits of data are added to the bitstream that constitutes the output of an encoder or the input to a decoder.

Accordingly, the speech coder is capable of selectively activating a series of encoders and decoders of different bitstream rates to maximize the overall quality of a reconstructed speech signal while maintaining the desired average bit rate.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. Moreover, in the figures, like reference numerals designate corresponding parts throughout the different views.

DETAILED DESCRIPTION OF THE PREFERRED EMBODIMENTS

Figure 1:
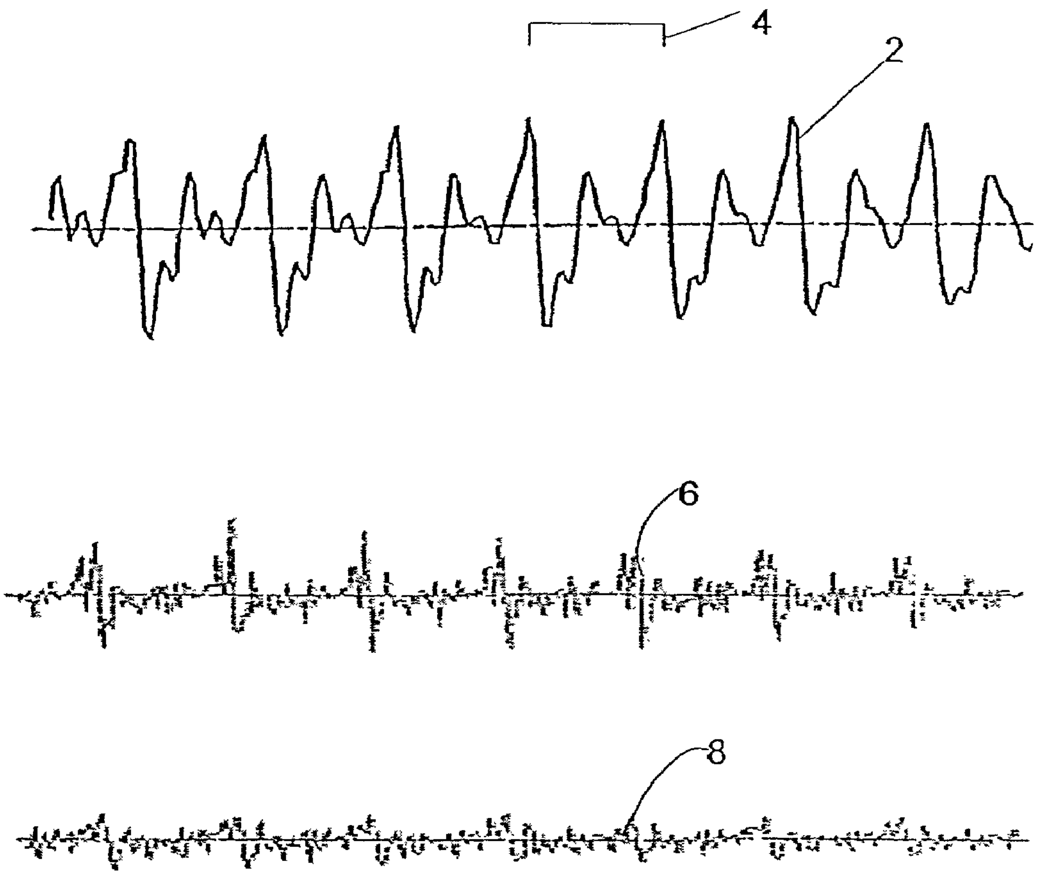
FIG. 1 is a graph representing time-domain speech patterns.

FIG. 1 depicts the waveforms in CELP speech coding. An input speech signal 2 has some measure of predictability or periodicity 4. At least a pitch gain, a pitch lag and a fixed codebook index are calculated from the speech signal 2. The code-excited linear prediction (CELP) coding approach uses two types of predictors, a short-term predictor and a long-term predictor. The short-term predictor is typically applied before the long-term predictor. The short-term predictor is also referred to as linear prediction coding (LPC) or spectral envelope representation, and typically may comprise ten prediction parameters.

Using CELP coding, a first prediction error may be derived from the short-term predictor and is called a short-term or LPC residual 6. The short-term LPC parameters, fixed-codebook indices and gain, as well as an adaptive codebook lag and its gain for the long-term predictor are quantized. The quantization indices, as well as the fixed codebook indices, are sent from the encoder to the decoder. The quality of the speech may be enhanced through a system that uses a plurality of fixed subcodebooks, rather than merely a single fixed subcodebook. Each lag parameter also may be called a pitch lag, and each long-term predictor gain parameter also may be called an adaptive codebook gain. The lag parameter defines an entry or a vector in the adaptive codebook.

Following the LPC analysis, the long-term predictor parameters and the fixed codebook entries that best represent the prediction error of the long-term residual are determined. A second prediction error may be derived from the long-term predictor and is called a long-term or pitch residual 8. The long-term residual may be coded using a fixed codebook that includes a plurality of fixed codebook entries or vectors. During coding, one of the entries is multiplied by a fixed codebook gain to represent the long-term residual. Analysis-by-synthesis (ABS), that is, feedback, is employed in the CELP coding. In the ABS approach, synthesizing with an inverse prediction filter and applying a perceptual weighting measure determine the best contribution from the fixed codebook and the best long-term predictor parameters.

The CELP decoder uses the fixed codebook indices to extract a vector from the fixed codebook or subcodebooks. The vector is multiplied by the fixed-codebook gain to create a fixed codebook contribution. A long-term predictor contribution is added to the fixed codebook contribution to create a synthesized excitation that is referred to as an excitation. The long-term predictor contribution comprises the excitation from the past multiplied by the long-term predictor gain. The long-term predictor contribution alternatively comprises an adaptive codebook contribution or a long-term pitch-filtering characteristic. The synthesized excitation is passed through a short-term synthesis filter, which uses the short-term LPC prediction coefficients quantized by the encoder to generate synthesized speech. The synthesized speech may be passed through a post-filter that reduces the perceptual coding noise. Other codecs and associated coding algorithms may be used, such as a selectable mode locoer (SUM) system, extended code excited linear prediction (eX-CELP), and algebraic CELP (A-CELP).

Figure 2:
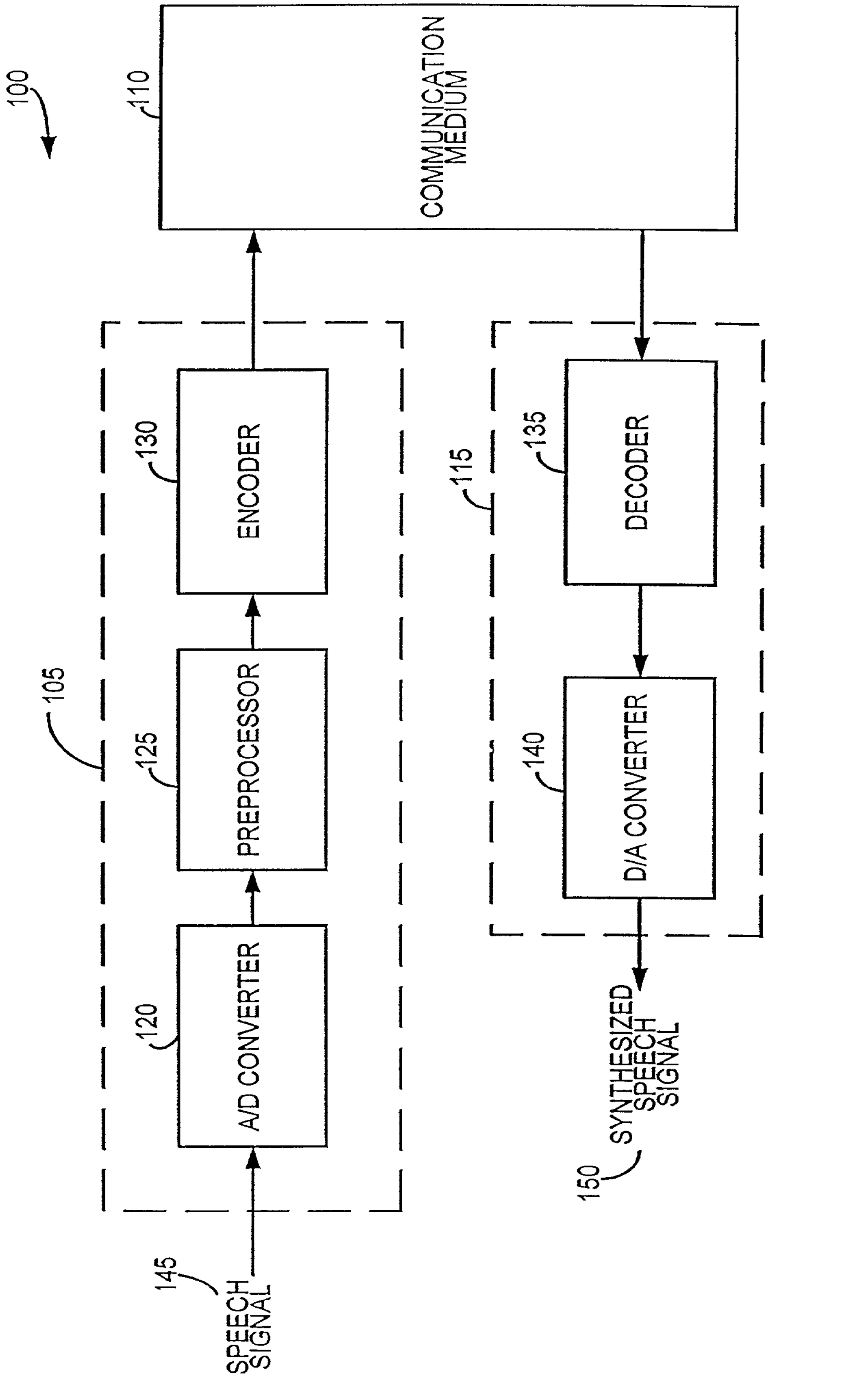
FIG. 2 is a block diagram of a speech-coding system according to the invention.

FIG. 2 is a block diagram of a speech coding system 100 with according to one embodiment that uses CELP coding. The speech coding system 100 includes a first communication device 105 operatively connected via a communication medium 110 to a second communication device 115. The speech coding system 100 may be any cellular telephone, radio frequency, or other communication system capable of encoding a speech signal 145 and decoding the encoded signal to create synthesized speech 150. The communications devices 105 and 115 may be cellular telephones, portable radio transceivers, and the like.

The communications medium 110 may include systems using any transmission mechanism, including radio waves, infrared, landlines, fiber optics, any other medium capable of transmitting digital signals (wires or cables), or any combination thereof. The communications medium 110 may also include a storage mechanism including a memory device, a storage medium, or other device capable of storing and retrieving digital signals. In use, the communications medium 110 transmits a bitstream of digital between the first and second communications devices 105 and 115.

The first communication device 105 includes an analog-to-digital converter 120, a preprocessor 125, and an encoder 130 connected as shown. The first communication device 105 may have an antenna or other communication medium interface (not shown) for sending and receiving digital signals with the communication medium 110. The first communication device 105 may also have other components known in the art for any communication device, such as a decoder or a digital-to-analog converter.

The second communication device 115 includes a decoder 135 and digital-to-analog converter 140 connected as shown. Although not shown, the second communication device 115 may have one or more of a synthesis filter, a postprocessor, and other components. The second communication device 115 also may have an antenna or other communication medium interface (not shown) for sending and receiving digital signals with the communication medium. The preprocessor 125, encoder 130, and decoder 135 comprise processors, digital signal processors (DSP), application specific integrated circuits, or other digital devices for implementing the coding and algorithms discussed herein. The preprocessor 125 and encoder 130 may comprise separate components or the same component In use, the analog-to-digital converter 120 receives a speech signal 145 from a microphone (not shown) or other signal input device. The speech signal may be voiced speech, music, or another analog signal. The analog-to-digital converter 120 digitizes the speech signal, providing the digitized speech signal to the preprocessor 125. The preprocessor 125 passes the digitized signal through a high-pass filter (not shown) preferably with a cutoff frequency of about 60–80 Hz. The preprocessor 125 may perform other processes to improve the digitized signal for encoding, such as noise suppression. The encoder 130 codes the speech using a pitch lag, a pitch gain, a fixed codebook, a fixed codebook gain, LPC parameters and other parameters. The code is transmitted in the communication medium 110.

The decoder 135 receives the bitstream from the communication medium 110. The decoder operates to decode the bitstream and generate a synthesized speech signal 150 in the form of a digitized signal. The synthesized speech signal 150 has been converted to an analog signal by the digital-to-analog converter 140. The encoder 130 and the decoder 135 use a speech compression system, commonly called a codec, to reduce the bit rate of the noise-suppressed digitized speech signal. For example, the code excited linear prediction (CELP) coding technique utilizes several prediction techniques to remove redundancy from the speech signal.

The CELP coding approach is frame-based. Samples of input speech signals (e.g., preprocessed, digitized speech signals) are stored in blocks of samples called frames. To minimize bandwidth use, each frame may be characterized. The frames are processed to create a compressed speech signal in digitized form. The frame characterization is based on the portion of the speech signal 145 contained in the particular frame. For example, frames may be characterized as stationary voiced speech, non-stationary voiced speech, unvoiced speech, onset, background noise, and silence. As will be seen, these classifications may be used to help determine the resources used to encode and decode each particular frame.

Figure 3:
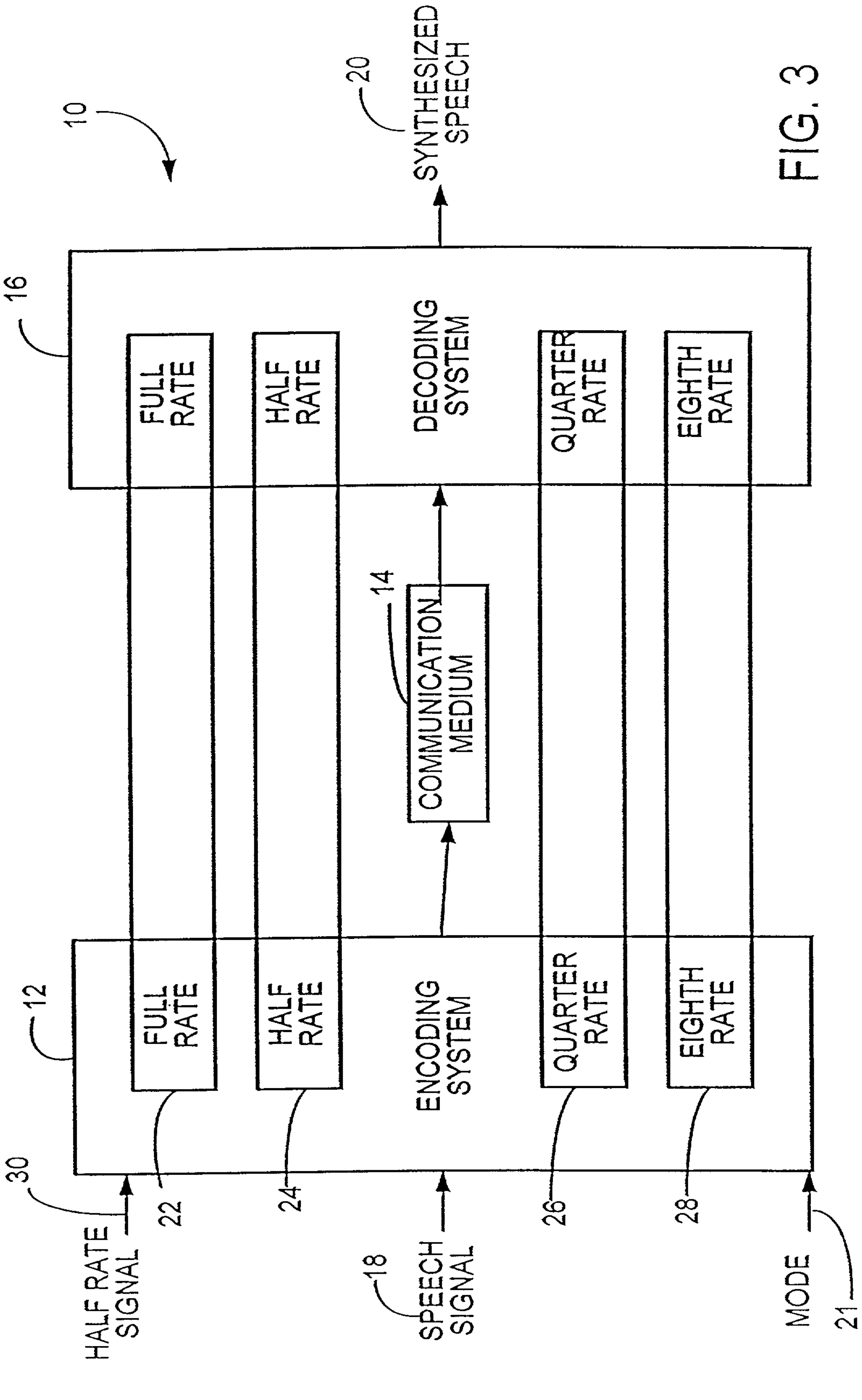
FIG. 3 is another block diagram of a speech coding system.

FIG. 3 shows an embodiment of a speech coding system 10 that may utilize adaptive and fixed codebooks, and in particular, may utilize fixed codebooks that comprise a plurality of fixed subcodebooks for encoding at different rates as a function of the characterization. The encoding system 12 receives a speech signal 18 from a signal input device such as a microphone (not shown). The speech coding system 10 includes four codecs, a full-rate codec 22, a half-rate codec 24, a quarter-rate codec 26 and an eighth-rate codec 28. There may be more or fewer codecs. Each codec has an encoder portion and a decoder portion located within the encoding and decoding systems 12 and 16 respectively. Each codec 22, 24, 26, and 28 may process a portion of the bitstream between the encoding system 12 and the decoding system 16. Desirably, the decoded speech is also post-processed by modules shown in later figures. The post-processed speech may be received by a human ear or by a recording device, or other device capable of receiving or using such a signal. Each codec generates a bitstream of a different bandwidth. In one embodiment, the full rate codec generates about 170 bits, the half-rate codec generates about 80 bits, the quarter-rate about 40 bits, and the eighth-rate about 16 bits respectively, per frame.

The speech processing circuitry is constantly changing the codec used to code and decode speech. By processing the frames of the speech signal 18 with the various codecs, an average bit rate is achieved. The average bit rate of the bitstream may be calculated as an average of the codecs used in any particular interval of time. A mode-line 21 carries a mode-input signal from a communications system. The mode-input signal controls the average rate of the encoding system 12, dictating which of a plurality of codecs is used within the encoding system 12.

In one embodiment of the speech compression system 10, the full- and half-rate codecs use an eX-CELP (extended CELP) algorithm. The eX-CELP algorithm categorizes frames into different categories using a rate selection and a type classification. The quarter- and eighth-rate codecs are based on a perceptual matching algorithm. Different encoding approaches may be used for different categories of frames with different perceptual matching, different waveform matching, and different bit assignments. In this embodiment, the perceptual matching algorithms of the quarter-rate and eighth-rate codecs do not use waveform matching.

The frames may be divided into a plurality of subframes. The subframes may be different in size and number for each codec. With respect to the eX-CELP algorithm, the subframes may be different in size for each classification. The CELP approach is used in eX-CELP to choose the adaptive codebook, the fixed codebook, and other parameters used to code the speech. The ABS scheme uses inverse prediction filters and perceptual weighting measures for selecting the codebook entries.

Figure 4:
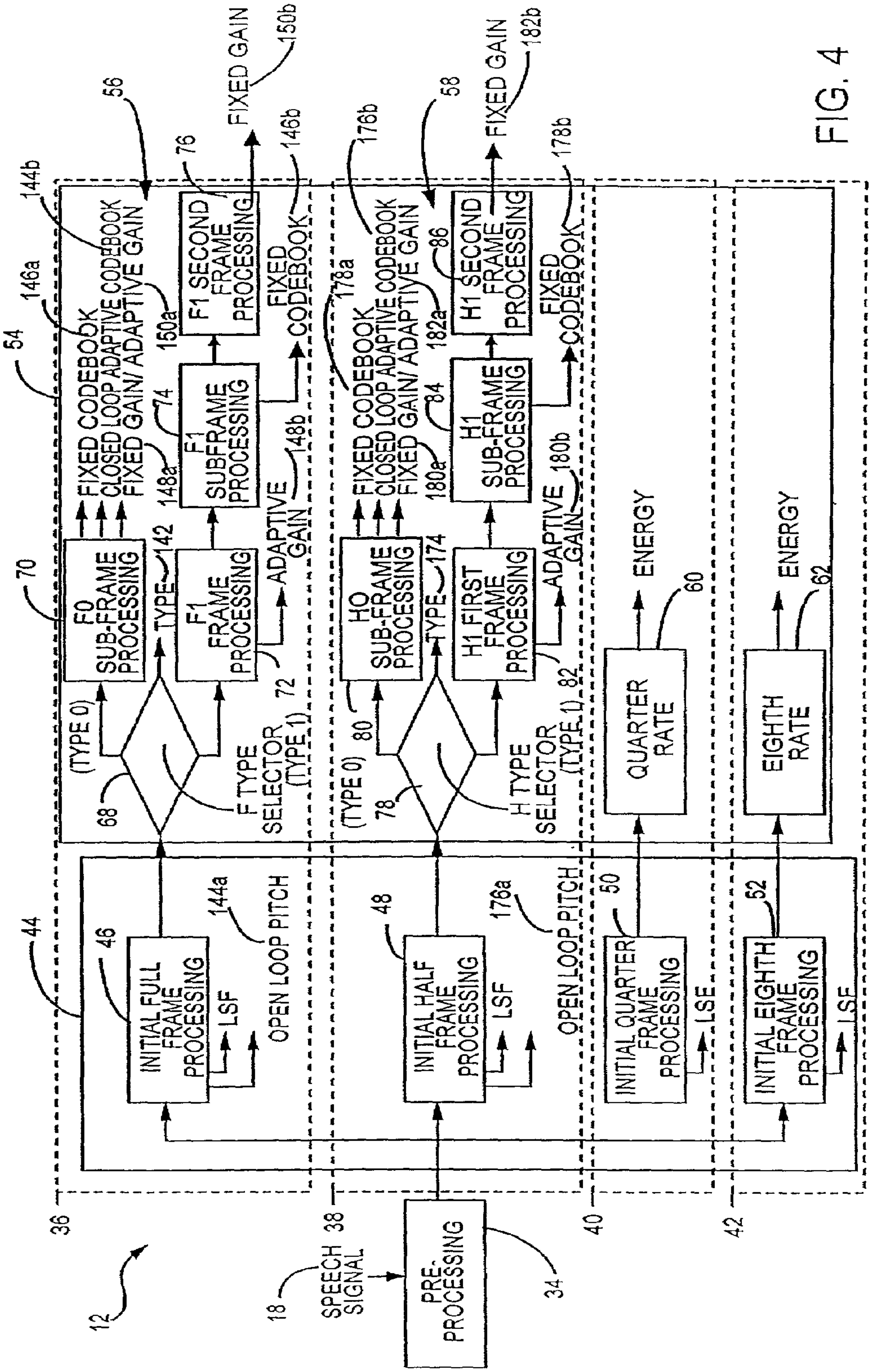
FIG. 4 is an expanded block diagram of a speech encoding system.

FIG. 4 is an expanded block diagram of the encoding system 12 shown in FIG. 3. One embodiment of the encoding system 12 includes a preprocessing module 34, a full-rate encoder 36, a half-rate encoder 38, a quarter-rate encoder 40, and an eighth-rate encoder 42, connected as illustrated. The pre-processing module 34 may be used to process speech on a frame basis to provide filtering, signal enhancement, noise enhancement, and amplification to optimize the signal for subsequent processing.

The rate encoders include an initial frame-processing module 44 and an excitation-processing module 54. The initial frame-processing module 44 is divided into a plurality of initial frame processing modules, namely, modules for the full-rate 46, half-rate 48, quarter-rate 50, and an initial eighth-rate frame processing module 52.

The full, half, quarter and eighth-rate encoders 36, 38, 40, and 42 comprise the encoding portion of the respective codecs 22, 24, 26, and 28. The initial frame-processing module 44 performs initial frame processing, extracts speech parameters, and determines which rate encoder will encode a particular frame. Module 44 determines a rate selection that activates one of the encoders 36, 38, 40, or 42. The rate selection may be based on the categorization of the frame of the speech signal 18 and the mode of the speech compression system. Activation of one of the rate encoders 36, 38, 40, or 42, correspondingly activates one of the initial frame-processing modules 46, 48, 50, or 52.

In addition to the rate selection, the initial frame-processing module 44 also determines a type classification for each frame that is processed by the full and half rate encoders 36 and 38. In one embodiment, the speech signal 18 as represented by one frame is classified as "type 0" or "type 1," depending on the nature and characteristics of the speech signal 18. In an alternative embodiment, additional classifications and supporting processing are provided.

Type 1 classification includes frames of the speech signal 18 having harmonic and formant structures that do not change rapidly. Type 0 classification includes all other frames. The type classification optimizes encoding by the initial full-rate frame-processing module 46 and the initial half-rate frame-processing module 48. In addition, the classification type and rate selection are used to optimize the encoding by the excitation-processing module 54 for the full and half-rate encoders 36 and 38.

In one embodiment, the excitation-processing module 54 is sub-divided into a full-rate module 56, a half-rate module 58, a quarter-rate module 60, and an eighth-rate module 62. The rate modules 56, 58, 60, and 62 correspond to the rate encoders 36, 38, 40, and 42. The full and half rate modules 56 and 58 in one embodiment both include a plurality of frame processing modules and a plurality of subframe processing modules, but provide substantially different encoding. The term "F" indicates full rate processing, "H" indicates half-rate processing, and "0" and "1" indicate type 0 and type 1, respectively.

The initial frame-processing module 44 includes modules for full-rate frame processing 46 and half-rate frame processing 48. These modules may calculate an open loop pitch 144*a* for a full-rate frame, or an open loop pitch 176*a* for a half-rate frame. These components may be used later.

The full rate module 56 includes an F type selector module 68, and an F0 subframe-processing module 70. Module 56 also includes modules for F1 processing, including an F1 first frame processing module 72, an F1 subframe processing module 74, and an F1 second frame-processing module 76. In a similar manner, the half rate module 58 includes an H type selector module 78, an H0 sub-frame processing module 80, an H1 first frame processing module 82, an H1 sub-frame processing module 84, and an H1 second frame-processing module 86.

The selector modules 68 and 78 direct the processing of the speech signals 18 to further optimize the encoding process based on the type classification. When the frame being processed is classified as full rate, selector module 68 directs the speech signal to either the F0 or F1 processing to encode the speech and generate the bitstream. Type 0 classification for a frame activates the processing module to process the frame on a subframe basis. Type 1 processing proceeds on both a frame and subframe basis. In type 0 processing, a fixed codebook component 146*a* and a closed loop adaptive codebook component 144*b* are generated and are used to generate fixed and adaptive codebook gains 148*a* and 150*a*. In type 1 processing, an adaptive gain 148*b* is derived from the first frame-processing module 72, and a fixed codebook 146*b* is selected and used to encode the speech with the subframe-processing module 74. A fixed codebook gain 150*b* is derived from the second frame-processing module 76. Type signal 142 designates the type as either F0 or F1 in the bitstream.

If the frame of the speech signal is classified as half-rate, selector module 78 directs the frame to either H0 (type 0) or H1 (type 1) processing. The same classifications are made with respect to type 0 or type 1 processing. In type 0 processing, H0 subframe processing module 80 generates a fixed codebook component 178*a* and a closed loop adaptive codebook component 176*b*, used to generate fixed and adaptive codebook gains 180*a* and 182*a*. In type 1 processing, an H1 first frame processing module 82, an H1 subframe processing module 84 and an H1 second frame processing module 86 are used. An adaptive gain 180*b*, a fixed codebook component 178*b*, and a fixed codebook gain are calculated. Type signal 174 designates the type as either H0 or H1 in the bitstream.

In a manner known to those skilled in the art, adaptive codebooks are then used to code the signal in the full rate and half rate codecs. An adaptive codebook search and selection for the full rate codec uses components 144*a* and 144*b*. These components are used to search, test, select and designate the location of a pitch lag from an adaptive codebook. In a similar manner, half-rate components 176*a* and 176*b* search, test, select and designate the location of the best pitch lag for the half-rate codec. These pitch lags are subsequently used to improve the quality of the encoded and decoded speech through fixed codebooks employing a plurality of fixed subcodebooks.

Figure 5:
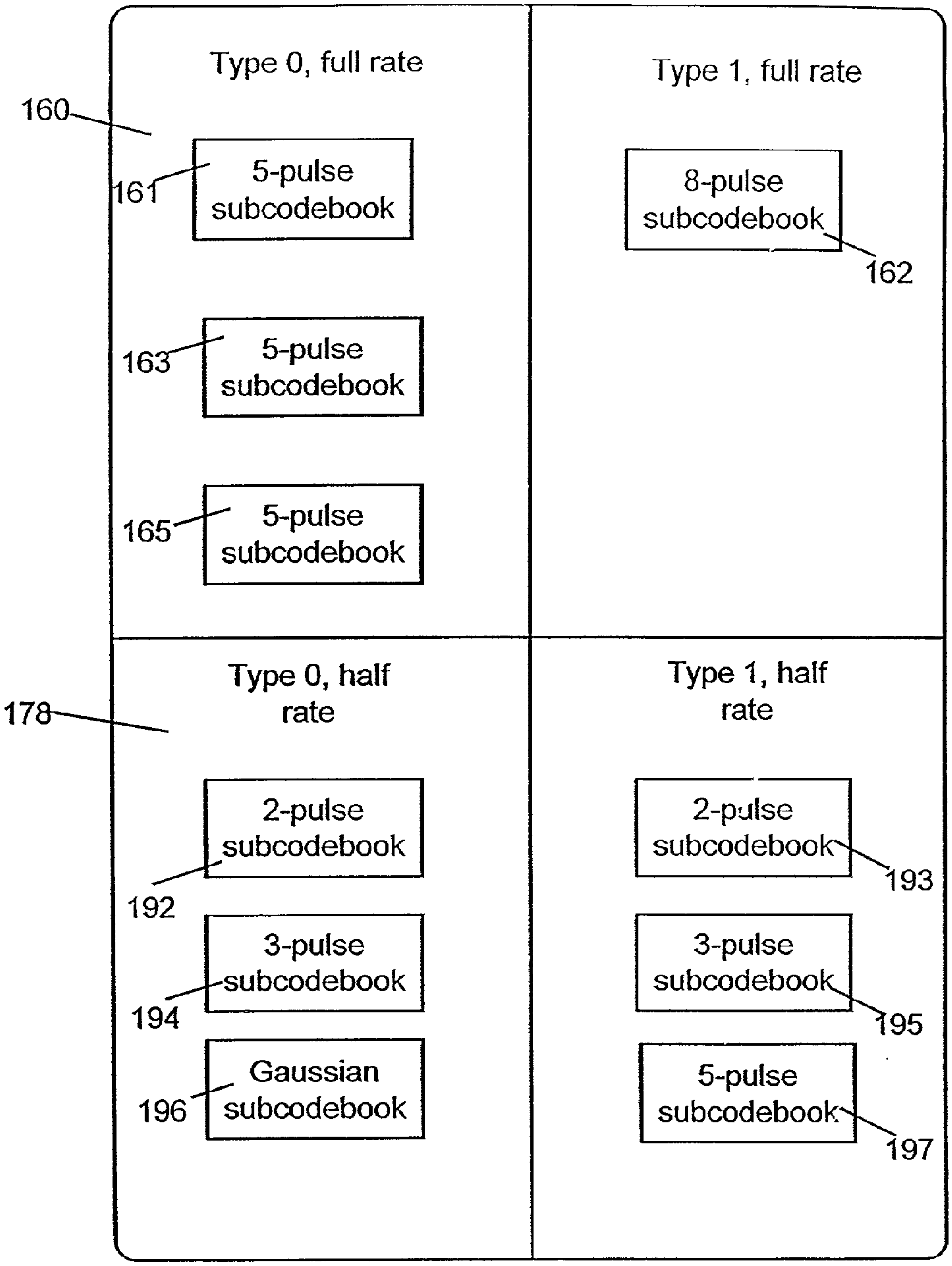
FIG. 5 is a block diagram of fixed codebooks.

FIG. 5 is a block diagram depicting the structure of fixed codebooks and subcodebooks in one embodiment. The fixed codebook 160 for the F0 codec comprises three (different) subcodebooks, each of them having 5 pulses. The fixed codebook for the F1 codec is a single 8-pulse subcodebook 162. For the half-rate codec, the fixed codebook 178 comprises three subcodebooks for the H0, a 2-pulse subcodebook 192, a three-pulse subcodebook 194, and a third subcodebook 196 with gaussian noise. In the H1 codec, the fixed codebook comprises a 2-pulse subcodebook 193, a 3-pulse subcodebook 195, and a 5-pulse subcodebook 197.

Fixed Codebook Encoding for Type 0 Frames

Figure 6:
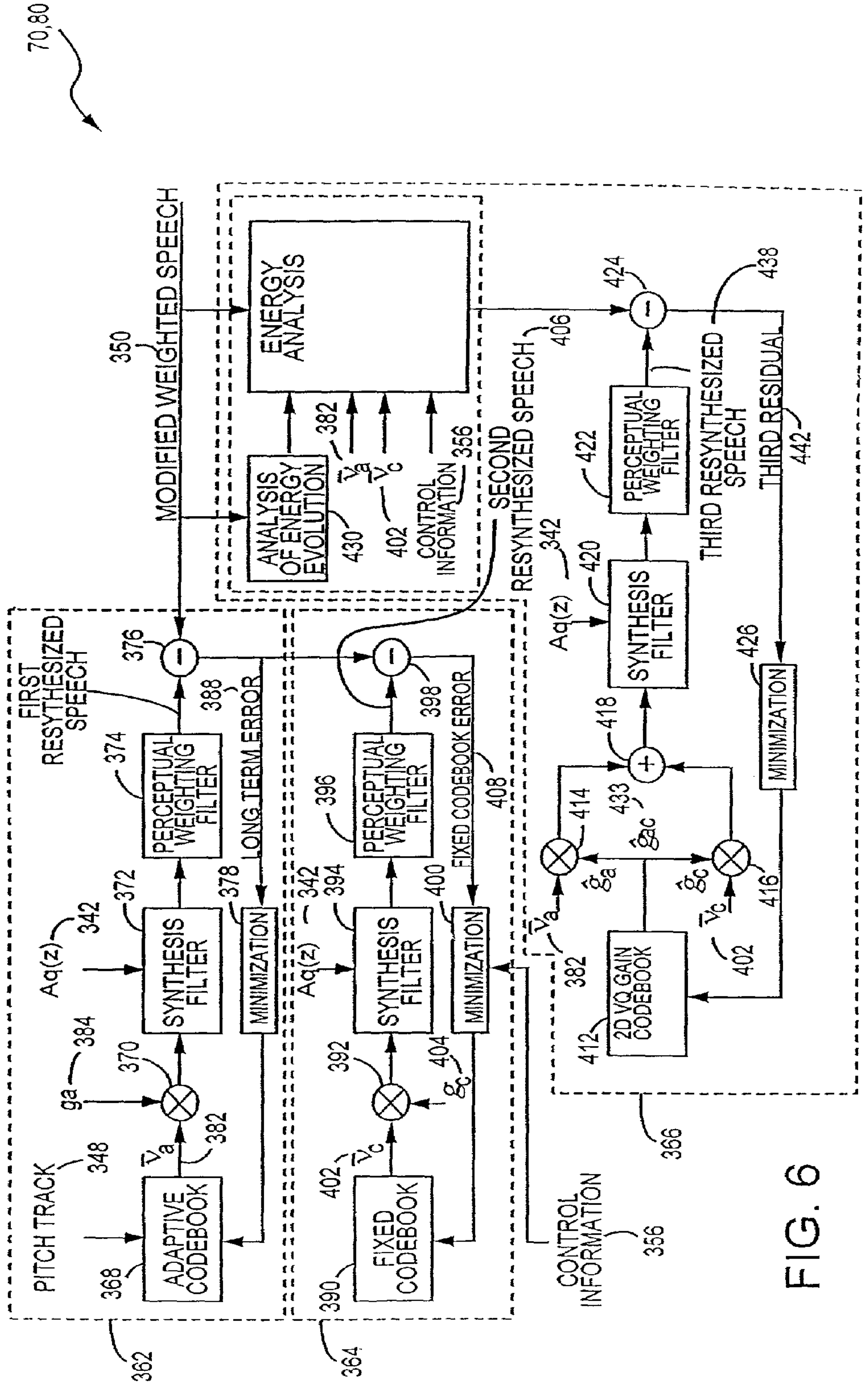
FIG. 6 is an expanded block diagram of the encoding system of FIG. 4.

FIG. 6 comprises F0 and H0 subframe processing modules 70 and 80, including an adaptive codebook section 362, a fixed codebook section 364, and a gain quantization section 366. The adaptive codebook section 368 receives a pitch track 348 to calculate an area in the adaptive codebook to search for an adaptive codebook vector ($v_a$) 382 (a pitch lag). The adaptive codebook section 368 also performs a search to determine and store the best lag vector $v_a$ for each subframe. An adaptive gain, $g_a$ 384.

FIG. 6 depicts the fixed codebook section 364, including a fixed codebook 390, a multiplier 392, a synthesis filter 394, a perceptual weighting filter 396, a subtractor 398, and a minimization module 400. The gain quantization section 366 may include a 2D VQ gain codebook 412, a first multiplier 414, a second multiplier 416, an adder 418, a synthesis filter 420, a perceptual weighting filter 422, a subtractor 424 and a minimization module 426. The gain quantization section 366 makes use of the second resynthesized speech 406 generated in the fixed codebook section, and also generates a third resynthesized speech 438.

The fixed codebook 390 fixed codebook vector ($v_c$) 402 representing the long-term residual for a subframe. The multiplier 392 multiplies the fixed codebook vector ($v_c$) 402 by a gain ($g_c$) 404. The gain ($g_c$) 404 is unquantized and is a representation of the initial value of the fixed codebook gain. The resulting signal is provided to the synthesis filter 394. The synthesis filter 394 receives the quantized LPC coefficients $A_q(z)$ 342 and together with the perceptual weighting filter 396, creates a resynthesized speech signal 406. The subtractor 398 subtracts the resynthesized speech signal 406 from the long-term error signal 388 to generate the weighted mean square error (WMSE), a fixed codebook error signal 408.

The minimization module 400 receives the fixed codebook error signal 408. The minimization module 400 uses the fixed codebook error signal 408 to control the selection of vectors for the fixed codebook vector ($v_c$) 402 from the fixed codebook 292 in order to reduce the error. The minimization module 400 also receives the control information 356 that may include a final characterization for each frame.

The final characterization class contained in the control information 356 controls how the minimization module 400 selects vectors for the fixed codebook vector ($v_c$) 402 from the fixed codebook 390. The process repeats until the search by the second minimization module 400 has selected the best vector for the fixed codebook vector ($v_c$) 402 from the fixed codebook 390 for each subframe. The best vector for the fixed codebook vector ($v_c$) 402 minimizes the error in the second resynthesized speech signal 406. The indices identify the best vector for the fixed codebook vector ($v_c$) 402 and, as previously discussed, may be used to form the fixed codebook components 146*a* and 178*a*.

Weighting Factors in Selecting a Fixed Subcodebook and a Codevector

Low-bit rate coding uses the important concept of perceptual weighting to determine speech coding. We introduce here a special weighting factor different from the factor previously described for the perceptual weighting filter in the closed-loop analysis. This special weighting factor is generated by employing certain features of speech, and applied as a criterion value in favoring a specific subcodebook in a codebook featuring a plurality of subcodebooks. One subcodebook may be preferred over the other subcodebooks for some specific speech signal, such as noise-like unvoiced speech. The features used to estimate the weighting factor include, but are not limited to, the noise-to-signal ratio (NSR), sharpness of the speech, the pitch lag, the pitch correlation, as well as other features. The classification system for each frame of speech is also important in defining the features of the speech.

The NSR is a traditional distortion criterion that may be calculated as the ratio between an estimate of the background noise energy and the frame energy of a frame. One embodiment of the NSR calculation ensures that only true background noise is included in the ratio by using a modified voice activity decision. In addition, previously calculated parameters representing, for example, the spectrum expressed by the reflection coefficients, the pitch correlation $R_p$, the NSR, the energy of the frame, the energy of the previous frames, the residual sharpness and the sharpness may also be used. Sharpness is defined as the ratio of the average of the absolute values of the samples to the maximum of the absolute values of the samples of speech. It is typically applied to the amplitude of the signals.

Pitch Correlation

One embodiment of the target signal for time warping is a synthesis of the current segment derived from the modified weighted speech that is represented by $s_w^{f}(n)$ and the pitch track 348 represented by $L_p(n)$. According to the pitch track 348, $L_p(n)$, each sample value of the target signal $s_w^{t}(n)$, $n=0, \ldots, N_s-1$ may be obtained by interpolation of the modified weighted speech using a $21^{st}$ order Hamming weighted Sinc window, $$s_w^t(n) = \sum_{i=-10}^{10} w_s(f(L_p(n)), i) \cdot s_w^t(n - I(L_p(n)) + i), \quad \text{for } n = 0, \ldots, N_s - 1 \qquad \text{(Equation 1)}$$

where $I(L_p(n))$ and $f(L_p(n))$ are the integer and fractional parts of the pitch lag, respectively; $w_s(f, i)$ is the Hamming weighted Sinc window, and $N_s$ is the length of the segment. A weighted target, $s_w^{wt}(n)$, is given by $s_w^{wt}(n)=w_e(n) \cdot s_w^{t}(n)$. The weighting function, $w_e(n)$, may be a two-piece linear function, which emphasizes the pitch complex and de-emphasizes the "noise" in between pitch complexes. The weighting may be adapted according to a classification, by increasing the emphasis on the pitch complex for segments of higher periodicity.

Signal Warping

The modified weighted speech for the segment may be reconstructed according to the mapping given by $$[s_w(n+\tau_{acc}), s_w(n+\tau_{acc}+\tau_c+\tau_{opt})] \rightarrow [s_w^f(n), s_w^f(n+\tau_c-1)], \qquad \text{(Equation 2)}$$

and $$[s_w(n+\tau_{acc}+\tau_c+\tau_{opt}), s_w(n+\tau_{acc}+\tau_{opt+N_s}-1)] \rightarrow [s_w^t(n+\tau_c), s_w^f(n+N_s-1)], \qquad \text{(Equation 3)}$$

where $\tau_c$ is a parameter defining the warping function. In general, $\tau_c$ specifies the beginning of the pitch complex. The mapping given by Equation 2 specifies a time warping, and the mapping given by Equation 3 specifies a time shift (no warping). Both may be carried out using a Hamming weighted Sinc window function.

Pitch Gain and Pitch Correlation Estimation

The pitch gain and pitch correlation may be estimated on a pitch cycle basis and are defined by Equations 2 and 3, respectively. The pitch gain is estimated in order to minimize the mean squared error between the target $s_w^{t}(n)$, defined by Equation 1, and the final modified signal $s_w^{f}(n)$, defined by Equations 2 and 3, and may be given by $$g_a = \frac{\sum_{n=0}^{N_s-1} s_w^{\prime}(n) \cdot s_w^{t}(n)}{\sum_{n=0}^{N_s-1} s_w^{t}(n)^2}. \qquad \text{(Equation 4)}$$

The pitch gain is provided to the excitation-processing module 54 as the unquantized pitch gains. The pitch correlation may be given by $$R_a = \frac{\sum_{n=0}^{N_s-1} s_w^{\prime}(n) \cdot s_w^{t}(n)}{\sqrt{\left(\sum_{n=0}^{N_s-1} s_w^{\prime}(n)^2\right) \cdot \left(\sum_{n=0}^{N_s-1} s_w^{t}(n)^2\right)}}. \qquad \text{(Equation 5)}$$

Both parameters are available on a pitch cycle basis and may be linearly interpolated.

Type 0 Fixed Codebook Search for the Full-Rate Codec

The fixed codebook component 146*a* for frames of Type 0 classification may represent each of four subframes of the full-rate codec 22 using the three different 5-pulse subcodebooks 160. When the search is initiated, vectors for the fixed codebook vector ($v_c$) 402 within the fixed codebook 390 may be determined using the error signal 388, represented by:

$$t'(n) = t(n) - g_a \cdot (e(n - L_p^{opt}) * h(n)). \qquad \text{(Equation 6)}$$

where t'(n) is a target for a fixed codebook search, t(n) is an original target signal, $g_a$ is an adaptive gain, e(n) is a post excitation to generate an adaptive codebook contribution, $L_p^{opt}$ is an optimized lag, and h(n) is an impulse response of a perceptually-weighted LPC synthesis filter.

Pitch enhancement may be applied to the 5-pulse codebooks 160 within the fixed codebook 390 in the forward direction or the backward direction during the search. The search is an iterative, controlled complexity search for the best vector from the fixed codebook 160. An initial value for the fixed codebook gain represented by the gain ($g_c$) 404 may be found simultaneously with the search.

Figure 7:
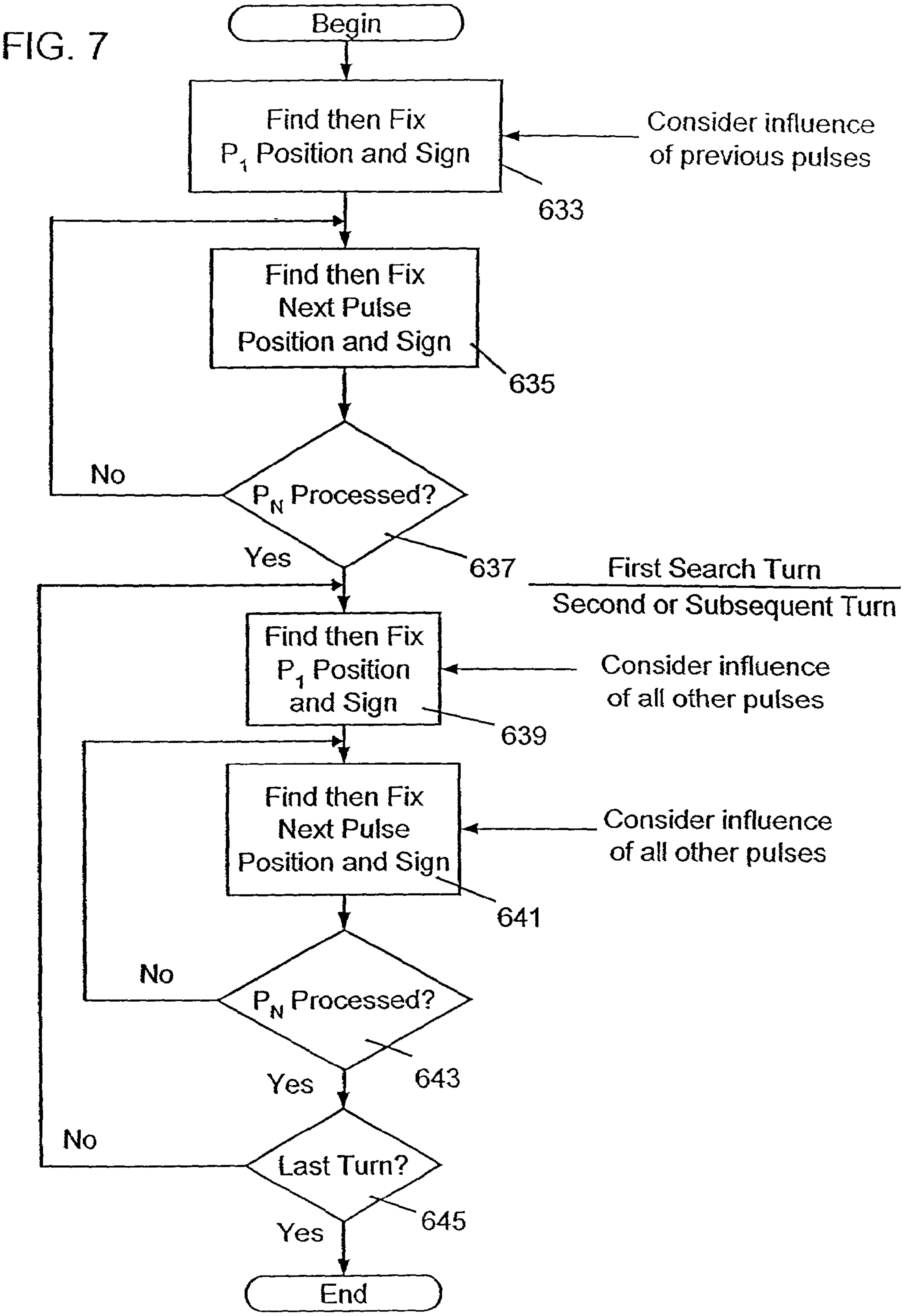
FIG. 7 is a flow chart for searching a fixed codebook.
Figure 8:
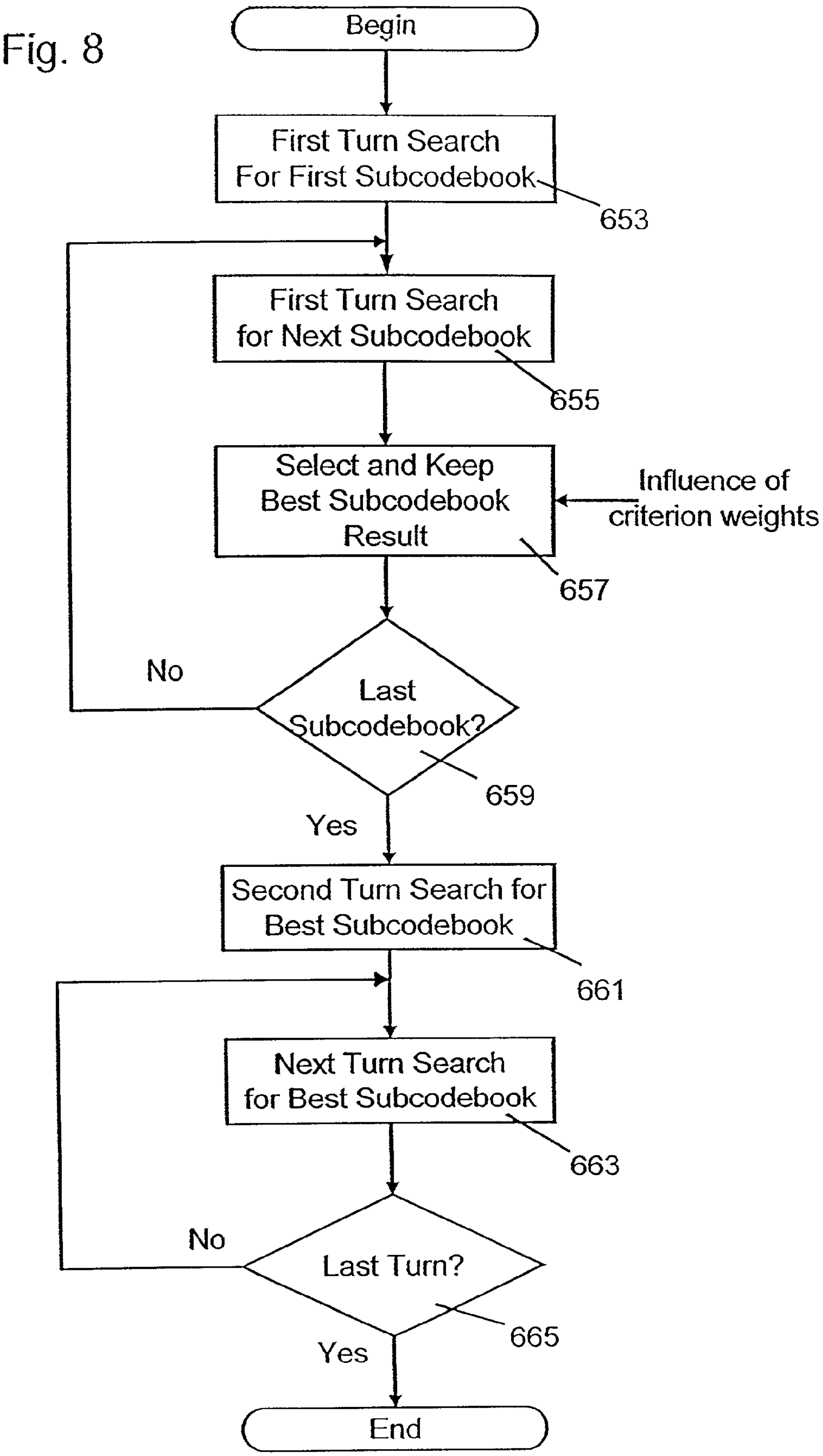
FIG. 8 is a flow chart for searching a fixed codebook.

FIGS. 7 and 8 illustrate the procedure used to search for the best indices in the fixed codebook. In one embodiment, a fixed codebook has k subcodebooks. More or fewer subcodebooks may be used in other embodiments. In order to simplify the description of the iterative search procedure, the following example first features a single subcodebook containing N pulses. The possible location of a pulse is defined by a plurality of positions on a track. In a first searching turn, the encoder processing circuitry searches the pulse positions sequentially from the first pulse 633 ($P_N=1$) to the next pulse 635, until the last pulse 637 ($P_N=N$). For each pulse after the first, the searching of the current pulse position is conducted by considering the influence from previously-located pulses. The influence is the desirable minimizing of the energy of the fixed subcodebook error signal 408. In a second searching turn, the encoder processing circuitry corrects each pulse position sequentially, again from the first pulse 639 to the last pulse 641, by considering the influence of all the other pulses. In subsequent turns, the functionality of the second or subsequent searching turn is repeated, until the last turn is reached 643. Further turns may be utilized if the added complexity is allowed. This procedure is followed until k turns are completed 645 and a value is calculated for the subcodebook.

FIG. 8 is a flow chart for the method described in FIG. 7 to be used for searching a fixed codebook comprising a plurality of subcodebooks. A first turn is begun 651 by searching a first subcodebook 653, and searching the other subcodebooks 655, in the same manner described for FIG. 7, and keeping the best result 657, until the last subcodebook is searched 659. If desired, a second turn 661 or subsequent turn 663 may also be used, in an iterative fashion. In some embodiments, to minimize complexity and shorten the search, one of the subcodebooks in the fixed codebook is typically chosen after finishing the first searching turn. Further searching turns are done only with the chosen subcodebook. In other embodiments, one of the subcodebooks might be chosen only after the second searching turn or thereafter, should processing resources so permit. Computations of minimum complexity are desirable, especially since two or three times as many pulses are calculated, rather than one pulse before enhancements described herein are added.

In an example embodiment, the search for the best vector for the fixed codebook vector ($v_c$) 402 is completed in each of the three 5-pulse codebooks 160. At the conclusion of the search process within each of the three 5-pulse codebooks 160, candidate best vectors for the fixed codebook vector ($v_c$) 402 have been identified. Selection of which of the candidate best vectors from which of the 5-pulse codebooks 160 will be used may be determined minimizing the corresponding fixed codebook error signal 408 for each of the three best vectors. For purposes of this discussion, the corresponding fixed codebook residual error 408 for each of the three candidate subcodebooks will be referred to as first, second, and third fixed codebook error signals.

The minimization of the weighted mean square errors (WMSE) from the first, second and third fixed codebook error signals is mathematically equivalent to maximizing a criterion value which may be first modified by multiplying a weighting factor in order to favor selecting one specific subcodebook. Within the full-rate codec 22 for frames classified as Type Zero, the criterion value from the first, second and third fixed codebook error signals may be weighted by the subframe-based weighting measures. The weighting factor may be estimated by a using a sharpness measure of the residual signal, a voice-activity detection module, a noise-to-signal ratio (NSR), and a normalized pitch correlation. Other embodiments may use other weighting factor measures. Based on the weighting and on the maximal criterion value, one of the three 5-pulse fixed codebooks 160, and the best candidate vector in that subcodebook, may be selected.

The selected 5-pulse codebook 161, 163 or 165 may then be fine searched for a final decision of the best vector for the fixed codebook vector ($v_c$) 402. The fine search is performed on the vectors in the selected 5-pulse codebook 160 that are in the vicinity of the best candidate vector chosen. The indices that identify the best vector (maximal criterion value) from the fixed codebook vector are in the bitstream to be transmitted to the decoder.

Encoding the pitch lag generates an adaptive codebook vector 382 (lag) and an adaptive codebook gain $g_a$ 384, for each subframe of type 1 processing. The lag is incorporated into the fixed codebook in one embodiment, by using the pitch enhancement differently for different subcodebooks, to increase excitation density. The use of the pitch enhancement should be incorporated during the searches in the encoder and the same pitch enhancement should be applied to the codevector from the fixed codebook in the decoder. For every vector found in the fixed codebook, the density of the codevector may be increased by convoluting with an impulsive response of pitch enhancement. This impulsive response always has a unit pulse at time 0 and includes an addition pulse at +1 pitch lag, −1 pitch lag, +2 pitch lags, −2 pitch lags, and so on. The magnitudes of these additional pitch pulses are determined by a pitch enhancement coefficient, which may be different for different subcodebooks. For type 0 processing, the pitch enhancement coefficient is calculated according the pitch gain, $g_{a\_m}$ from the previous subframe of the adaptive codebook section, multiplied by a factor that depends on the fixed subcodebook.

Examples of typical pitch enhancement coefficients are listed in Table 1. This table is typically used for the half-rate codec, although it could also be employed for the full-rate. The benefit from a more flexible pitch enhancement for the full-rate codec is less significant, because the full rate excitation from a large fixed codebook with a short subframe size is already very rich. The coefficients for Type 1 will be explained below.

TABLE 1

| | Pitch Enhancement Coefficients | |
|---|---|---|
| | Type 0 | Type 1 |
| Subcodebook #1 | $0.5 \leqq 0.75 \cdot g_{a\_m}$ 1.0 | $0.5 \leqq 0.75 \cdot g_a$ 1.0 |
| Subcodebook #2 | $0.0 \leqq 0.25 \cdot g_{a\_m}$ 0.5 | $0.0 \leqq 0.50 \cdot g_a$ 0.5 |
| Subcodebook #3 | 0 | $0.0 \leqq 0.50 \cdot g_a$ 0.5 |

In one embodiment for F0 processing, the pitch enhancement coefficient for the whole fixed codebook could be the previous pitch gain $g_{a\_m}$ multiplied by a factor of 0.75. The result may be limited to a value between 0.0 and 1.0. The above Table may also be used to determine the pitch enhancement coefficients for different subcodebooks. The pitch enhancement coefficient for the first subcodebook may be the pitch gain of the previous subframe, $g_{a\_m}$, multiplied by 0.75. The result may be limited to values between 0.5 and 1.0. Similarly, for F0 processing with a second subcodebook, the pitch enhancement coefficients could be limited to values between $0.0 \leqq 0.25 \cdot g_{a\_m} \leqq 0.5$; the pitch enhancement coefficient could be zero for the third subcodebook.

Figure 9:
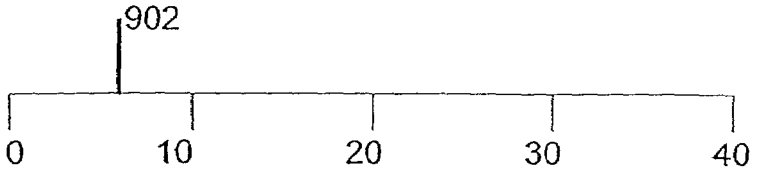
FIG. 9 is a schematic diagram illustrating pitch enhancements.

In the example of FIG. 9, speech is processed in frames of 160 samples with four subframes of 40 samples for F0. A pitch lag of 16 samples may be calculated and forwarded by an adaptive codebook contribution. The use of 16 samples is merely a convenience, and pitch lags are usually larger than 16. A fixed codebook in the same speech coder/decoder may be searched and a close match of one of the pulses from the fixed codebook found at sample 6. In this example, the fixed codebook generates a pulse at sample 6 and the pitch enhancement generates additional pulses at sample 22 and at sample 38. Because the pitch enhancement coefficient has been calculated according to available information, no additional bits need to be transmitted to capture the extra pulse density.

Figure 10:
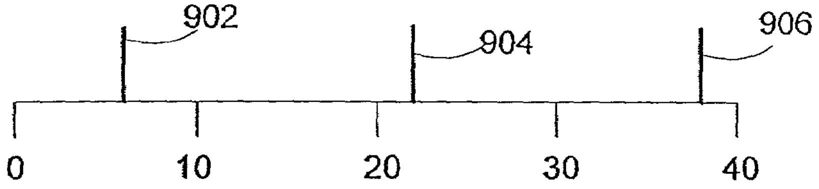
FIG. 10 is a schematic diagram illustrating pitch enhancements.
Figure 11:
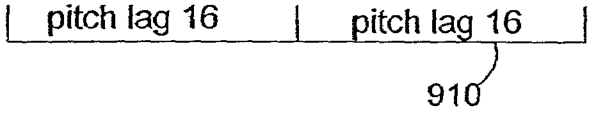
FIG. 11 is a schematic diagram illustrating pitch enhancements.

FIG. 9 illustrates a single pulse 902 at about location 6 (samples) generated by a fixed codebook. In one embodiment, shown in FIG. 10, a pitch enhancement adds pulses 904 and 906 additional to the original pulse 902 from the fixed codebook. The additional pulses correspond to at intervals 910 of 16 samples, as shown in FIG. 11. This illustrates a pitch enhancement applied in a "forward" direction.

Figure 12:
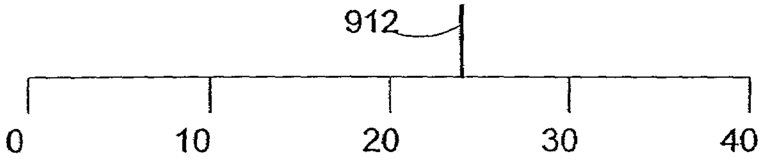
FIG. 12 is a schematic diagram illustrating pitch enhancements.
Figure 13:
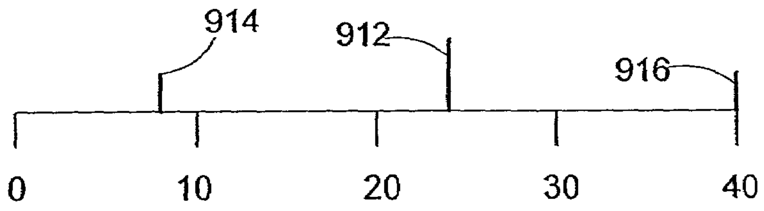
FIG. 13 is a schematic diagram illustrating pitch enhancements.

In another embodiment, the pitch enhancement may be applied in a "backward" direction. FIG. 12 illustrates a pulse 912 from a fixed codebook at 24 (samples). Using the previous example of a pitch lag of 16 samples, a pulse 916 is added in a forward direction at 40 (samples), as seen in FIG. 13. A pulse 914 is added in a backward direction at 8 (samples), calculated by subtracting 16 from 24. It has been found that speech coded with these enhancements sounds more natural and more similar to an original spoken voice. The fixed codebook pulses in this embodiment are processed as described and shown in the previous examples. In this example, a pitch enhancement coefficient is applied to the pitch pulses that are +1 or −1 pitch lag away from the main pulse.

Type 0 Fixed Codebook Search for the Half-Rate Codec

The fixed codebook component 178*a* for frames of Type 0 classification represents the fixed codebook contribution for each of the two subframes of the half-rate codec 24. The representation may be based on the pulse codebooks 192 and 194 and the gaussian subcodebook 196. The initial target for the fixed codebook gain represented by the gain ($g_c$) 404 may be determined similarly to the full-rate codec 22. In addition, during the search for the fixed codebook vector ($v_c$) 402 within the fixed codebook 390, the criterion value may be weighted similarly to the full-rate codec 22, from a perceptual point of view. In the half-rate codec 24, the weighting may be applied to favor selecting the best vector from the gaussian subcodebook 196 when the input reference signal is noise-like. The weighting helps determine the most suitable fixed subcodebook vector ($v_c$) 402.

The pitch enhancement discussed in the F0 processing applies also to the half rate H0, which in one embodiment is processed in subframes of 80 samples. The pitch lags are derived in the same manner from the adaptive codebook, as is the pitch gain, $g_a$ 384. In H0 processing, as in F0 processing, a pitch gain from the previous subframe, $g_{a\_m}$, is used. In one embodiment, the pitch enhancement coefficient for the first subcodebook 192 is estimate by multiplying the pitch gain of the previous subframe by a factor of 0.75, where resulting $0.75 \cdot g_{a\_m}$ is limited to values between 0.5 and 1.0. Similarly, for H0 processing with a second subcodebook, the pitch enhancement coefficient is multiplied by 0.25, with the resulting $0.25 \cdot g_{a\_m}$ is limited to values between 0.0 and 0.25.

Figure 14:
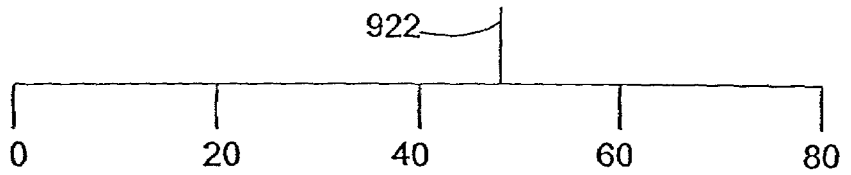
FIG. 14 is a schematic diagram illustrating pitch enhancements.
Figure 15:
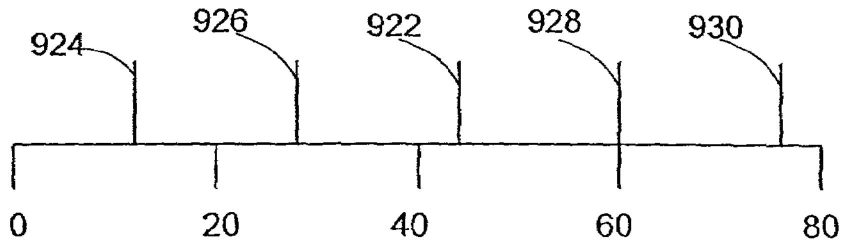
FIG. 15 is a schematic diagram illustrating pitch enhancements.
Figure 16:
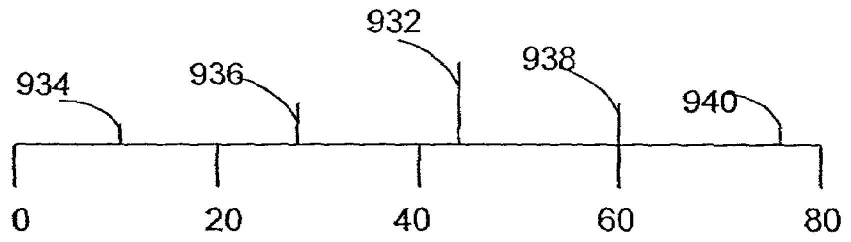
FIG. 16 is a schematic diagram illustrating pitch enhancements.

An example is depicted in FIGS. 14-16. For the H0 codec, 2-subframe processing is used, and in this example, an initial pulse from a subcodebook for the H0 codec is at about 44. This is shown in FIG. 14 as 922. Additional pulses introduced by the pitch enhancement are located at ±1 and ±2 pitch lags away from the initial pulse, or in this example, at 12, 28, 60 and 76, for a pitch lag of 16. This is depicted in FIG. 15, with pulses at ±1 pitch lag at 28 and 60, 926 and 928 respectively, and ±2 pitch lags, at 12 and 76, 924 and 930 respectively. FIG. 16 depicts a pitch enhancement coefficient of 0.5 applied once to the pulses 936 and 938. The coefficient is applied twice (0.5 to the second power, or 0.25) to the pulses 934 and 940.

The search for the best vector for the fixed codebook vector ($v_c$) 402 is based on minimizing the energy of the fixed codebook error signal 408 as previously discussed. The search may first be performed on the 2-pulse subcodebook 192. The 3-pulse codebook 194 may be searched next, in several steps. The current step may determine a starting point for the next step. Backward and forward pitch enhancement may be applied during the search and after the search in both pulse subcodebooks 192 and 194. The gaussian subcodebook 196 may be searched last, using a fast search routine based on two orthogonal basis vectors.

The selection of one of the subcodebooks 192, 194 or 196 and the best vector ($v_c$) 402 from the selected subcodebook may be performed in a manner similar to that used for the full-rate codec 22. The indices that identify the best fixed codebook vector ($v_c$) 402 within the selected subcodebook are the fixed codebook component 178*a* in the bitstream. The unquantized initial values of the gains ($g_a$) 384 and ($g_c$) 404 may now be finalized based on the vectors for the adaptive codebook vector ($v_a$) 382 (lag) and the fixed codebook vector ($v_c$) 402 previously determined. They are jointly quantized within the gain quantization section 366. Determination and quantization of the gains occurs within the gain quantization section 366.

Fixed Codebook Encoding for Type 1 Frames

Figure 17:
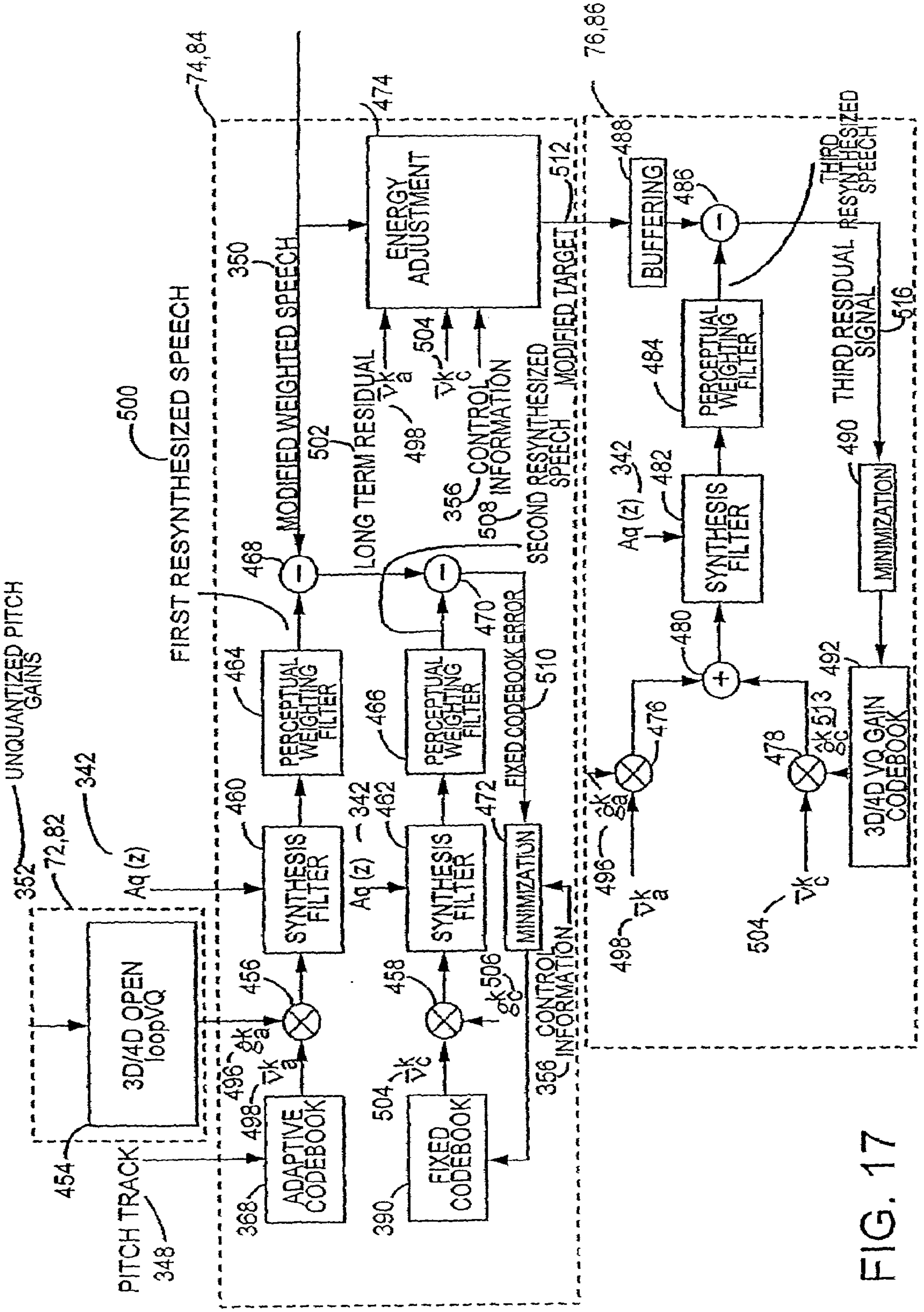
FIG. 17 is another expanded block diagram of the encoding system of FIG. 4.

Referring now to FIG. 17, the F1 and H1 first frame processing modules 72 and 82 include a 3D/4D open loop VQ module 454. The F1 and H1 sub-frame processing modules 74 and 84 include the adaptive codebook 368, the fixed codebook 390, a first multiplier 456, a second multiplier 458, a first synthesis filter 460 and a second synthesis filter 462. In addition, the F1 and H1 sub-frame processing modules 74 and 84 include a first perceptual weighting filter 464, a second perceptual weighting filter 466, a first subtractor 468, a second subtractor 470, a first minimization module 472 and an energy adjustment module 474. The F1 and H1 second frame processing modules 76 and 86 include a third multiplier 476, a fourth multiplier 478, an adder 480, a third synthesis filter 482, a third perceptual weighting filter 484, a third subtractor 486, a buffering module 488, a second minimization module 490 and a 3D/4D VQ gain codebook 492.

The processing of frames classified as Type 1 within the excitation-processing module 54 provides processing on both a frame basis and a sub-frame basis. For purposes of brevity, the following discussion refers to the modules within the full rate codec 22. The modules in the half rate codec 24 function similarly unless otherwise noted. Quantization of the adaptive codebook gain by the F1 first frame-processing module 72 generates the adaptive gain component 148*b*. The F1 subframe processing module 74 and the F1 second frame processing module 76 operate to determine the fixed codebook vector and the corresponding fixed codebook gain, respectively as previously set forth. The F1 subframe-processing module 74 uses the track tables to generate the fixed codebook component 146*b* as illustrated in FIG. 4.

The F1 second frame processing module 76 quantizes the fixed codebook gain to generate the fixed gain component 150*b*. In one embodiment, the full-rate codec 22 uses 10 bits for the quantization of 4 fixed codebook gains, and the half-rate codec 24 uses 8 bits for the quantization of the 3 fixed codebook gains. The quantization may be performed using moving average prediction.

First Frame Processing Module

In FIG. 12, the 3D/4D open loop VQ module 454 receives the unquantized pitch gains 352 from a pitch pre-processing module (not shown). The 3D/4D open loop VQ module 454 quantizes the unquantized pitch gains 352 to generate a quantized pitch gain ($g^k_a$) 496 representing quantized pitch gains for each subframe where k is the number of subframes. In one embodiment, there are four subframes for the full-rate codec 22 and three subframes for the half-rate codec 24 which correspond to four quantized gains ($g^1_a$, $g^2_a$, $g^3_a$, and $g^4_a$) and three quantized gains ($g^1_a$, $g^2_a$, and $g^3_a$) of each subframe, respectively. The index location of the quantized pitch gain ($g^k_a$) 496 within the pre-gain quantization table represents the adaptive gain component 148*b* for the full-rate codec 22 or the adaptive gain component 180*b* for the half-rate codec 24. The quantized pitch gain ($g^k_a$) 496 is provided to the F1 subframe-processing module 74 or the H1 second subframe-processing module 84.

In one embodiment, for a first subcodebook and for type 1 processing, the quantized pitch gain for the subframe is multiplied by 0.75, and the resulting pitch enhancement coefficient is constrained to lie between 0.5 and 1.0, inclusive. In another embodiment, for a second or a third subcodebook, the quantized pitch gain may be multiplied by 0.5, and the resulting pitch enhancement factor constrained to lie between 0 and 0.5, inclusive. While this technique may be used for both the full rate and half-rate type 1 codecs, a greater advantage will inure to the use in the half-rate codec.

Sub-Frame Processing Module

The F1 or H1 subframe-processing module 74 or 84 uses the pitch track 348 to identify an adaptive codebook vector ($v^k_a$) 498, representing the adaptive codebook contribution for each subframe, where k=the subframe number. In one embodiment, there are four subframes for the full-rate codec 22 and three subframes for the half-rate codec 24 which correspond to four vectors ($v^1_a$, $v^2_a$, $v^3_a$, and $v^4_a$) and three vectors ($v^1_a$, $v^2_a$, and $v^3_a$) for the adaptive codebook contribution for each subframe, respectively.

The adaptive codebook vector ($v^k_a$) 498 selected and the quantized pitch gain ($g^k_a$) 496 are multiplied by the first multiplier 456. The first multiplier 456 generates a signal that is processed by the first synthesis filter 460 and the first perceptual weighting filter module 464 to provide a first resynthesized speech signal 500. The first synthesis filter 460 receives the quantized LPC coefficients $A_q(z)$ 342 from an LSF quantization module (not shown) as part of the processing. The first subtractor 468 subtracts the first resynthesized speech signal 500 from the modified weighted speech 350 provided by a pitch pre-processing module (not shown) to generate a long-term residual signal 502.

The F1 or H1 subframe-processing module 74 or 84 also performs a search for the fixed codebook contribution that is similar to that performed by the F0 and H0 subframe-processing modules 70 and 80. Vectors for a fixed codebook vector ($v^k_c$) 504 that represents the long-term residual for a subframe are selected from the fixed codebook 390. The second multiplier 458 multiplies the fixed codebook vector ($v^k_c$) 504 by a gain ($g^k_c$) 506 where k equals the subframe number as previously discussed. The gain ($g^k_c$) 506 is unquantized and represents the fixed codebook gain for each subframe. The resulting signal is processed by the second synthesis filter 462 and the second perceptual weighting filter 466 to generate a second component of resynthesized speech signal 508. The second resynthesized speech signal 508 is subtracted from the long-term error signal 502 by the second subtractor 470 to produce a fixed codebook error 510.

The fixed codebook error signal 510 is received by the first minimization module 472 along with control information 356. The first minimization module 472 operates in the same manner as the previously discussed second minimization module 400 illustrated in FIG. 6. The search process repeats until the first minimization module 472 has selected a fixed codebook vector ($v^k_c$) 504 from the fixed codebook 390 for each subframe. The best vector for the fixed codebook vector ($v^k_c$) 504 minimizes the energy of the fixed codebook error signal 510. The indices identify the best fixed codebook vector ($v^k_c$) 504, and form the fixed codebook components 146*b* and 178*b*.

Type 1 Fixed Codebook Search for Full-Rate Codec

In one embodiment, the 8-pulse codebook 162, illustrated in FIG. 5, is used for each of the four subframes for frames of type 1 by the full-rate codec 22. The target for the fixed codebook vector ($v^k_c$) 504 is the long-term error signal 502. The long-term error signal 502, represented by t'(n), is determined based on the modified weighted speech 350, represented by t(n), with the adaptive codebook contribution from the initial frame processing module 44 removed according to:

$$t'(n) = t(n) - g_a \cdot (v_a(n) * h(n)), \text{ where} \qquad \text{(Equation 7)}$$

$$v_a(n) = \sum_{i=-10}^{10} w_s(f(L_p(n)), i) \cdot e(n - I(L_p(n)) + i)$$

and where t'(n) is a target for a fixed codebook search, $g_a$ is a pitch gain, h(n) is an impulse response of a perceptually weighted synthesis filter, e(n) is past excitation, $I(L_p(n))$ is an integer part of a pitch lag and $f(L_p(n))$ is a fractional part of a pitch lag, and $w_s$ (f, i) is a Hamming weighted Sinc window.

During the search for the fixed codebook vector ($v^k_c$) 504, pitch enhancement may be applied in the forward, or forward and backward directions. In addition, the search procedure minimizes the fixed codebook error 508 using an iterative search procedure with controlled complexity to determine the best fixed codebook vector $v^k_c$ 504. An initial fixed codebook gain represented by the gain ($g^k_c$) 506 is determined during the search. The indices identify the best fixed codebook vector ($v^k_c$) 504 and form the fixed codebook component 146*b* as previously discussed.

Fixed Codebook Search for Half-Rate Codec

In one embodiment, the long-term residual is represented by an excitation from a fixed codebook with 13 bits for each of the three subframes for frames classified as Type 1 for the half-rate codec 24. The long-term residual error 502 may be used as a target in a similar manner to the fixed codebook search in the full-rate codec 22. Similar to the fixed-codebook search for the half-rate codec 24 for frames of Type 0, high-frequency noise injection, additional pulses that are determined by correlation in the previous subframe, and a weak short-term filter may be added to enhance the fixed codebook contribution connected to the second synthesis filter 462. In addition, forward, or forward and backward pitch enhancement may be also.

For Type 1 processing, the adaptive codebook gain 496 calculated above is also used to estimate the pitch enhancement coefficients for the fixed subcodebook. However, in one embodiment of type 1 processing, the adaptive codebook gain of the current subframe, $g_a$, rather than that of the previous subframe is used. In one embodiment, a full search is performed for a 2-pulse subcodebook 193, a 3-pulse subcodebook 195, and a 5-pulse subcodebook 197, as illustrated in FIG. 5. The best fixed codebook vector ($v^k_c$) 504 that minimizes the fixed codebook error signal 510 is selected for the representation of the long term residual for each subframe. In addition, an initial fixed codebook gain represented by the gain ($g^k_c$) 506 may be determined during the search similar to the full-rate codec 22. The indices identify the vector for the fixed codebook vector ($v^k_c$) 504 and form the fixed codebook component 178*b*.

In one embodiment for H1 processing, the pitch enhancement coefficients for different subcodebooks are also determined using Table 1. The pitch enhancement coefficient for the first subcodebook could be the pitch gain of the current subframe, $g_a$, limited to a value between 0.5 and 1.0. Similarly, for H1 processing with second and third subcodebooks, the pitch enhancement coefficient could be $0.0 \leqq 0.5\, g_a \leqq 0.5$.

As previously discussed, the F1 or H1 subframe-processing modules 74 or 84 operate on a subframe basis. However, the F1 or H1 second frame-processing modules 76 or 86 operate on a frame basis. Accordingly, parameters determined by the F1 or H1 subframe-processing module 74 or 84 are stored in the buffering module 488 for later use on a frame basis. In one embodiment, the parameters stored are the adaptive codebook vector ($v^k_a$) 498 and the fixed codebook vector ($v^k_c$) 504, a modified target signal 512 and the gains 496 ($g^k_a$) and 506 ($g^k_c$) representing the initial adaptive and fixed codebook gains.

Using the vectors and pitch gains, the fixed codebook gains ($g^k_c$) 506 are determined by vector quantization (VQ). The fixed codebook gains ($g^k_c$) 506 replace the unquantized initial fixed codebook gains determined previously. To determine the fixed codebook gains, a joint delayed quantization (VQ) of the fixed-codebook gains for each subframe is performed by the second frame-processing modules 76 and 86.

FIG. 17 comprises F1 and H1 subframe processing modules 74 and 84, respectively. Each uses a pitch track provided to identify a pitch vector ($v^k_a$) 498. The pitch vector with the pitch gain represents a long-term prediction contribution for each subframe where k =the number of subframes. In one embodiment, there are four subframes for the F1 codec 22 and three subframes for the H1 codec 24.

Decoding System

Figure 18:
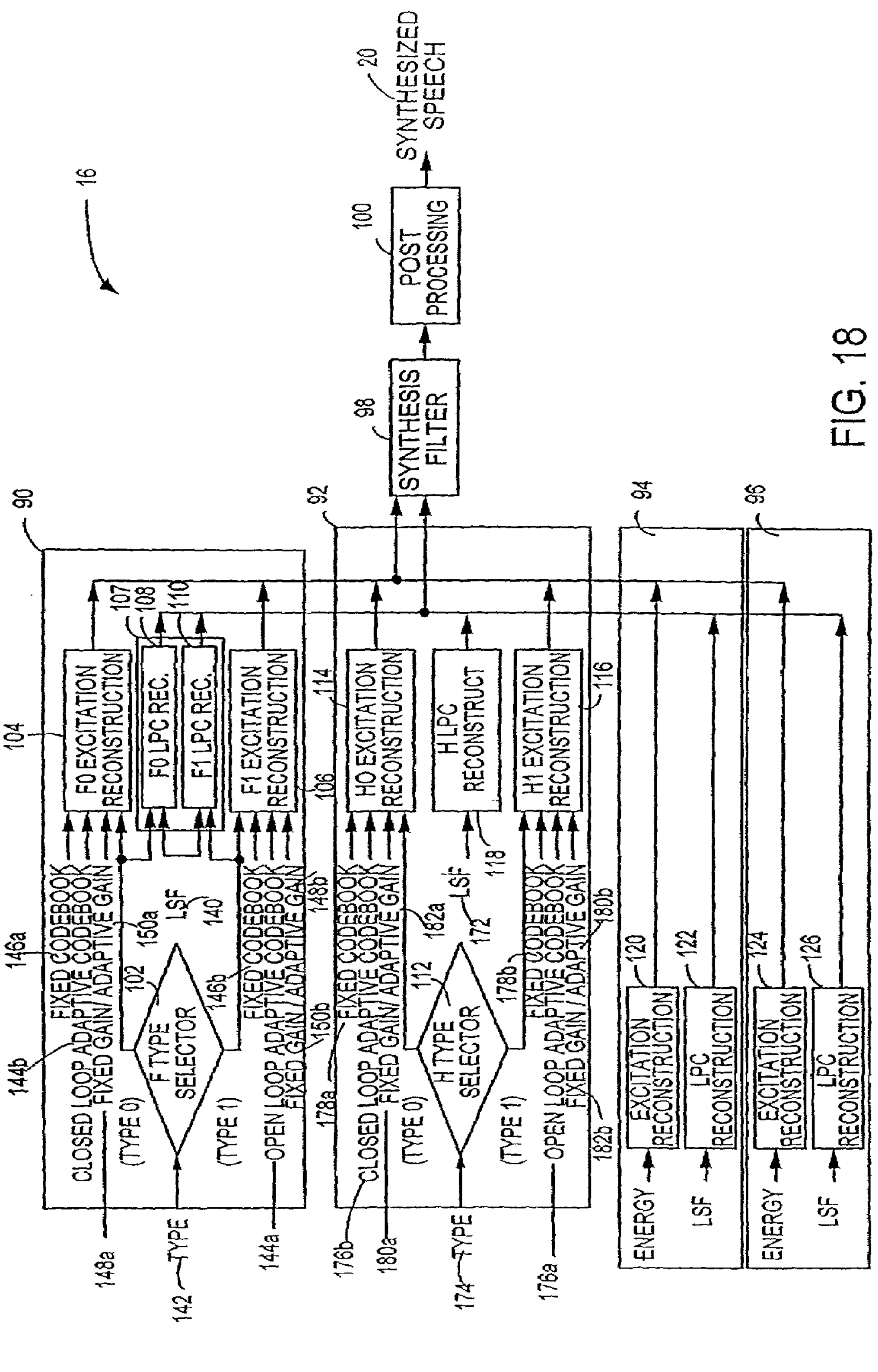
FIG. 18 is an expanded block diagram of the decoding system of FIG. 3.

Referring now to FIG. 18, a functional block diagram represents the full and half rate decoders 90 and 92 of FIG. 4. One embodiment of the decoding system 16 includes a full-rate decoder 90, a half-rate decoder 92, a quarter-rate decoder 94, and an eighth-rate decoder 96, a synthesis filter module 98, and a post-processing module 100. The decoders are the decoding portion of the full, half, quarter and eighth rate codecs 22, 24, 26, and 28 shown in FIG. 2.

The decoders 90, 92, 94, and 96 receive the bitstream as shown in FIG. 2, and transform the bitstream back to different parameters of the speech signal 18. The decoders decode each frame as a function of the rate selection and classification. The rate selection is provided from the encoding system 12 to the decoding system 16 by an external signal in a control channel in a wireless communications system. The synthesis filter 98 assembles the parameters of the speech signal 18 that are decoded by the decoders, thus generating reconstructed speech. The reconstructed speech is passed thorough the post-processing module 100 to create post-processed synthesized speech 20. Post-processing module 100 can include filtering, signal enhancement, noise modification, amplification, tilt correction, and other similar techniques capable of improving the perceptual quality of the synthesized speech.

The decoders 90 and 92 perform inverse mapping of the components of the bit-stream to algorithm parameters. The inverse mapping may be followed by a type classification dependent synthesis within the full and half-rate codecs 22 and 24.

The decoding for the quarter-rate codec 26 and the eighth rate coded 28 are similar to those of the full and half rate codecs. However, the quarter-rate and eighth-rate codecs use vectors of similar yet random numbers and an energy gain, rather than the adaptive codebooks 368 and fixed codebooks 390. The random numbers and an energy gain may be used to reconstruct an excitation energy that represents the excitation of a frame. Excitation modules 120 and 124 may be used respectively to generate portions of the quarter-rate and eighth-rate reconstructed speech. LSFs encoded during the encoding process may be used by LPC reconstruction modules 122 and 126 respectively for the quarter-rate and eighth-rate reconstructed speech.

Within the full and half rate decoders 90 and 92, operation of the excitation modules 104, 106, 114, and 116 depends on the type classification provided by the type component 142 and 174, just as did the encoding. The adaptive codebook 368 receives information reconstructed by the decoding system 16 from the adaptive codebook components 144 and 176 provided in the bitstream by the encoding system 12. Depending on the type classification system provided, the synthesis filter assembles the parameters of the speech signal 18 that are decoded by the decoders, 90, 92, 94, and 96.

One embodiment of the full rate decoder 90 includes an F-type selector 102 and a plurality of excitation reconstruction modules. The excitation reconstruction modules comprise an F0 excitation reconstruction module 104 and an F1 excitation reconstruction module 106. In addition, the full rate decoder 90 includes an LPC reconstruction module 107. The LPC reconstruction module 107 comprises an F0 LPC reconstruction module 108 and an F1 LPC reconstruction module 110. The other speech parameters encoded by full rate encoder 36 are reconstructed by the decoder 90 to reconstruct speech.

Similarly, an embodiment of the half-rate decoder 92 includes an H-type selector 112 and a plurality of excitation reconstruction modules. The excitation reconstruction modules comprise an H0 excitation reconstruction module 114 and an H1 excitation reconstruction module 116. In addition, the half-rate decoder 92 comprises an H LPC reconstruction module 118. In a manner similar to that of the full rate encoder, the other speech parameters encoded by the half rate encoder 38 are reconstructed by the half rate decoder to reconstruct speech.

The F and H type selectors 102 and 112 selectively activate appropriate respective portions of the full and half rate decoders 90 and 92 respectively. A type 0 classification activates the F0 reconstruction module 104 or H0 114. The respective F0 or F1 LPC reconstruction modules are used to reconstruct the speech from the bitstream. The same process used to encode the speech is used in reverse to decode the signals, including the pitch lags, pitch gains, and any additional factors used, such as the coefficients described above.

While various embodiments of the invention have been described, it will be apparent to those of ordinary skill in the art that many more embodiments and implementations are possible that are within the scope of this invention.

What is claimed is:

1. A method of pitch enhancement in a speech compression system, the method comprising:

providing a fixed codebook comprising at least two fixed subcodebooks;

selecting one of the at least two fixed subcodebooks;

calculating a pitch enhancement coefficient dependent upon the one of the at least two fixed subcodebooks;

applying a pitch enhancement in response to the pitch enhancement coefficient and the one of the at least two fixed subcodebooks;

where the pitch enhancement is applied both forward and backward, where the pitch enhancement coefficient is applied to pulses selected from the group consisting of forward, backward, and forward and backward pitch pulses, of a main pulse, and where the pitch enhancement coefficient is applied to a first power for pulses one pitch lag away from the main pulse, and the pitch enhancement coefficient is applied to a second power for pulses two pitch lags away from the main pulse.

2. The method of claim 1 comprising:

calculating the pitch enhancement coefficient based on the one of the at least two fixed subcodebooks, wherein the pitch enhancement coefficient is calculated according to a quantized long term predictor gain of a previous subframe multiplied by a factor that is different for each of the at least two fixed subcodebooks.

3. The method of claim 2, where applying the pitch enhancement further comprises calculating a pitched-enhanced signal from a codevector selected from the one of the at least two fixed subcodebook, a pitch lag, and the pitch enhancement coefficient.

4. The method of claim 3, where the signal is calculated during a search through the fixed subcodebooks.

5. The method of claim 3, where the signal is calculated during an iterative search through the one of the at least two fixed subcodebooks.

6. The method of claim 2, where the pitch enhancement coefficient is a mathematical factor from 0.0 to 1.0.

7. The method of claim 2, where the selecting the one of the at least two fixed subcodebooks and the calculating the pitch enhancement coefficient are accomplished by using at least one factor selected from the group consisting of a pitch correlation, a residual sharpness, a noise-to-signal ratio, and a pitch lag.

8. The method of claim 2, where the method is applied to a selectable mode vocoder (SMV) system.

9. The method of claim 2, where the method is applied to a code-excited linear prediction (CELP) system.

10. The method of claim 2, wherein for a first type speech classification the pitch enhancement coefficient is calculated according to a quantized long term predictor gain of a previous subframe multiplied by a factor that is different for each of the at least two fixed subcodebooks, and wherein for a second type speech classification pitch enhancement coefficient is calculated according to a quantized long term predictor gain multiplied by a factor that is different for each of the at least two fixed subcodebooks.

11. The method of claim 10, wherein the first type speech classification includes speech signals having a harmonic structure, and wherein the second type speech classification includes speech signals having a non-harmonic structure.

12. The method of claim 2, where the pitch enhancement coefficient is $0.25 \cdot g_{a\_m}$, and the value of $0.25 \cdot g_{a\_m}$ is constrained to be between 0.0 and 0.5, inclusive, where $g_{a\_m}$ is the quantized long term predictor gain of the previous subframe.

13. The method of claim 1, where the pitch enhancement coefficient is $0.75 \cdot g_{a\_m}$, where the value of $0.75 \cdot g_{a\_m}$ is constrained to be between 0.5, and 1.0, inclusive, where $g_{a\_m}$ is a quantized long term predictor gain of a previous subframe.

14. The method of claim 1, where the pitch enhancement coefficient is $0.25 \cdot g_{a\_m}$ and the value of $0.25 \cdot g_{a\_m}$ is constrained to be between 0.0 and 0.5, inclusive, where $g_{a\_m}$ is a quantized long term predictor gain of a previous subframe.

15. The method of claim 1, where the pitch enhancement coefficient is 0.

16. The method of claim 1, where the pitch enhancement coefficient is $1.0 \cdot g_n$ and the value of $1.0 \cdot g_a$ is constrained to be between 0.5 and 1.0, inclusive, where $g_a$ is a quantized pitch gain.

17. The method of claim 1, where the pitch enhancement coefficient is $0.5 \cdot g_a$ and the value of $0.5 \cdot g_a$ is constrained to be between 0.0 and 0.5 inclusive, where $g_a$ is a quantized pitch gain.

18. A speech coding system comprising:

a pitch enhancement coefficient;

a fixed codebook comprising at least two fixed subcodebooks; and a pitch enhancement based on the pitch enhancement coefficient and the one of the at least two fixed subcodebooks, wherein the pitch enhancement coefficient is dependent on the selected fixed subcodebook, where the pitch enhancement is applied forward and backward;

where the pitch enhancement coefficient is applied to pulses selected from the group consisting of forward, backward, and forward and backward pitch pulses of a main pulse;

where the pitch enhancement coefficient is applied to a first power for pulses one pitch lag away from the main pulse, and the pitch enhancement coefficient is applied to a second power for pulses two pitch lags away from the main pulse.

19. The speech coding system of claim 18 comprising:

the pitch enhancement coefficient calculated based on the one of the at least two fixed subcodebooks, wherein the pitch enhancement coefficient is calculated according to a quantized long term predictor gain of a previous subframe multiplied by a factor constant number that is different for each of the at least two fixed subcodebooks.

20. The speech coding system of claim 19, where the pitch enhancement comprises a pitch-enhanced signal calculated from a pitch lag, a codevector selected from the one of the at least two fixed subcodebooks, and the pitch enhancement coefficient.

21. The speech coding system of claim 20, where the pitch-enhanced signal is calculated during a search through the one of the at least two fixed subcodebooks.

22. The speech coding system of claim 20, where the pitch-enhanced signal is calculated during an iterative search through the one of the at least two fixed subcodebooks.

23. The speech coding system of claim 19, where the pitch enhancement coefficient is a mathematical factor from 0.0 to 1.0.

24. The speech coding system of claim 19, wherein for a first type speech classification the pitch enhancement coefficient is calculated according to a quantized long term predictor gain of a previous subframe multiplied by a factor that is different for each of the at least two fixed subcodebooks, and wherein for a second type speech classification pitch enhancement coefficient is calculated according to a quantized long term predictor gain multiplied by a factor that is different for each of the at least two fixed subcodebooks.

25. The speech coding system of claim 24, wherein the first type speech classification includes speech signals having a harmonic structure, and wherein the second type speech classification includes speech signals having a non-harmonic structure.

26. The speech coding system of claim 19, where the pitch enhancement coefficient is $0.25 \cdot g_{a\_m}$, and the value of $0.25 \cdot g_{a\_m}$ is constrained to be between 0.0 and 0.5, inclusive, where $g_{a\_m}$ is the quantized long term predictor gain of the previous subframe.

27. The speech coding system of claim 19, where the algorithm uses at least one factor selected from the group consisting of a pitch correlation, a residual sharpness, a noise-to-signal ratio, and a pitch lag in calculating the signal.

28. The speech coding system of claim 19, where the speech compression system is a selectable mode vocoder (SMV) system.

29. The speech coding system of claim 19, where the speech compression system is a code excited linear prediction (CELP) system.

30. The speech coding system of claim 18, where the pitch enhancement coefficient is $0.75 \cdot g_{a\_m}$ and the value of $0.75 \cdot g_{a\_m}$ is constrained to be between 0.5 and 1.0, inclusive, where $g_{a\_m}$ is a quantized gain of a previous subframe.

31. The speech coding system of claim 18, where the pitch enhancement coefficient is $0.25 \cdot g_{a\_m}$, and the value of $0.25 \cdot g_{a\_m}$ is constrained to be between 0.0 and 0.5, inclusive, where $g_{a\_m}$ is a quantized long term predictor gain of a previous subframe.

32. The speech coding system of claim 18, where the pitch enhancement coefficient is 0.

33. The speech coding system of claim 18, where the pitch enhancement coefficient $1.0 \cdot g_a$ and the value of $1.0 \cdot g_a$ is constrained to be between 0.5 and 1.0, inclusive, where $g_a$ is a quantized pitch gain.

34. The speech coding system of claim 18, where the pitch eithancement coefficient is $0.5 \cdot g_a$ and the value of $0.5 \cdot g_a$ is constrained to be between 0.0 and 0.5 inclusive, where $g_a$ is a quantized pitch gain.

* * * * *

UNITED STATES PATENT AND TRADEMARK OFFICE

CERTIFICATE OF CORRECTION

PATENT NO. : 7,117,146 B2 Page 1 of 1
APPLICATION NO. : 09/940904
DATED : October 3, 2006
INVENTOR(S) : Yang Gao It is certified that error appears in the above-identified patent and that said Letters Patent is hereby corrected as shown below:

Column 21, line 25, “subcodebook” should be changed to --subcodebooks--.

Column 21, line 65, the “,” after “0.5” should be deleted.

Column 22, line 8, “$g_n$” should be changed to --$g_a$--.

Column 24, line 16, “eithancement” should be changed to --enhancement--.

Signed and Sealed this

Sixth Day of March, 2007

JON W. DUDAS
*Director of the United States Patent and Trademark Office*